(12) United States Patent
Fish

(10) Patent No.: US 8,145,795 B2
(45) Date of Patent: Mar. 27, 2012

(54) DISTRIBUTED MEANS OF ORGANIZING AN ARBITRARILY LARGE NUMBER OF COMPUTERS

(76) Inventor: Russell Fish, Dallas, TX (US)

( * ) Notice: Subject to any disclaimer, the term of this patent is extended or adjusted under 35 U.S.C. 154(b) by 0 days.

(21) Appl. No.: 12/703,220

(22) Filed: Mar. 16, 2010

(65) Prior Publication Data

US 2012/0005375 A1    Jan. 5, 2012

Related U.S. Application Data

(60) Division of application No. 11/805,643, filed on May 24, 2007, which is a continuation of application No. 09/887,391, filed on Jun. 22, 2001, now abandoned.

(51) Int. Cl.
*G06F 15/16* (2006.01)
(52) U.S. Cl. ........ 709/250; 709/201; 709/208; 709/220; 718/100; 700/19
(58) Field of Classification Search .................. 709/201, 709/203, 208, 220, 250; 700/9, 19, 28; 718/100
See application file for complete search history.

(56) References Cited

U.S. PATENT DOCUMENTS

| | | | |
|---|---|---|---|
| 4,616,358 A | 10/1986 | Rehm et al. | |
| 4,855,903 A | 8/1989 | Carleton et al. | |
| 5,166,674 A | 11/1992 | Baum et al. | |
| 5,224,100 A | 6/1993 | Lee et al. | |
| 5,371,744 A | 12/1994 | Campbell et al. | |
| 5,471,580 A | 11/1995 | Fujiwara et al. | |
| 5,483,652 A | 1/1996 | Sudama et al. | |
| 5,540,441 A | 7/1996 | Ilan et al. | |
| 5,544,314 A | 8/1996 | Fuchsreiter et al. | |
| 5,574,770 A | 11/1996 | Yoo et al. | |
| 5,706,276 A | 1/1998 | Arslan et al. | |
| 5,835,723 A | 11/1998 | Andrews et al. | |
| 5,850,592 A | 12/1998 | Ramanathan | |
| 5,859,983 A | 1/1999 | Heller et al. | |
| 5,884,031 A | 3/1999 | Ice | |
| 5,933,826 A | 8/1999 | Ferguson | |
| 5,940,529 A | 8/1999 | Buckley | |
| 5,983,214 A | 11/1999 | Lang et al. | |
| 6,026,447 A | 2/2000 | Badovinatz et al. | |
| 6,028,857 A | 2/2000 | Poor | |
| 6,035,331 A | 3/2000 | Soga et al. | |
| 6,058,423 A | 5/2000 | Factor | |
| 6,078,847 A | 6/2000 | Eidson et al. | |
| 6,084,864 A | 7/2000 | Liron | |
| 6,088,758 A | 7/2000 | Kaufman et al. | |
| 6,144,989 A | 11/2000 | Hodjat et al. | |
| 6,175,899 B1 | 1/2001 | Baylor et al. | |
| 6,226,788 B1 | 5/2001 | Schoening et al. | |
| 6,230,252 B1 | 5/2001 | Passint et al. | |
| 6,381,628 B1 | 4/2002 | Hunt | |
| 6,453,360 B1 * | 9/2002 | Muller et al. ................. | 709/250 |
| 6,807,580 B2 * | 10/2004 | Freeman et al. .............. | 709/249 |
| 7,685,224 B2 * | 3/2010 | Nye .............................. | 709/201 |

* cited by examiner

*Primary Examiner* — Frantz Jean
(74) *Attorney, Agent, or Firm* — Carl F. Melito

(57) ABSTRACT

A technique for organizing a plurality of computers such that message broadcast, content searching, and computer identification of the entire collection or a subset of the entire collection may be performed quickly without the use of a controlling computer. The technique describes the creation, operation, and maintenance of a connection scheme by which each computer in the collection appears to be the top level of a hierarchical array. The maintenance of this hierarchical connection scheme allows one to many communications throughout the collection of computers to scale geometrically rather than linearly.

24 Claims, 40 Drawing Sheets

| Level | Population of the Level | Total Network Population |
|---|---|---|
| 1 | 1 | 1 |
| 2 | 4 | 5 |
| 3 | 8 | 13 |
| 4 | 12 | 25 |
| 5 | 16 | 41 |
| 6 | 20 | 61 |
| 7 | 24 | 85 |
| 8 | 28 | 113 |
| 9 | 32 | 145 |
| 10 | 36 | 181 |

FIG. 6

| Initial State \ Next State | State1 | State2 | State3 | State4 | State5 | State6 | State7 |
|---|---|---|---|---|---|---|---|
| State1 | X | Found collection of computers | X | X | X | X | X |
| State2 | Lost N0 link | X | Found edge of collection on radial | Found edge of collection on indirect radial | Found edge of collection on indirect radial, N012 vacant | Found edge of collection on indirect radial, N1 & N01 vacant | Found edge of collection on indirect radial, N1 vacant & on radial |
| State3 | Lost all links | X | X | Orbit counter-clockwise | Orbit counter-clockwise N012 vacant | Orbit counter-clockwise N1 & N01 vacant | X |
| State4 | Lost all links | X | X | X | Orbit counter-clockwise N012 vacant | Orbit counter-clockwise N1 & N01 vacant | Orbit counter-clockwise N1 vacant & on radial |
| State5 | Lost all links | X | X | X | X | N01 disappears | X |
| State6 | Lost all links | X | X | X | X | X | X |
| State7 | Lost all links | X | Orbit counter-clockwise | X | X | X | X |

FIG. 9A-1

| Next State / Initial State | State1 | State2 | State3 | State4 | State5 | State6 | State7 |
|---|---|---|---|---|---|---|---|
| State8 | Lost all links | X | X | X | N1 disappears | N1 & N01 disappear | Orbit counter-clockwise N1 is on radial |
| State9 | Lost N0 link | X | X | X | X | X | N1 disappears |
| State10 | Lost all links | X | N1 & N2 disappear | X | X | X | X |
| State11 | Lost all links | X | X | X | N1 & N2 disappear | N1, N2 & N01 disappear | X |
| State12 | Lost all links | X | N0 reappears | X | X | X | X |
| State13 | Lost all links | X | Decay to radial, N2 vacant | N0 reappears | X | X | X |
| State14 | Lost all links | X | | | | | |

FIG. 9A-2

| Next State / Initial State | State8 | State9 | State10 | State11 | State12 | State13 | State14 |
|---|---|---|---|---|---|---|---|
| State1 | X | X | X | X | X | X | X |
| State2 | X | Found collection of computers, N1 is on radial | X | X | X | X | X |
| State3 | X | X | N2 appears | X | X | X | X |
| State4 | Orbit counter-clockwise | N1 appears on radial | X | N1 appears | X | N0 disappears | X |
| State5 | N1 reappears | X | X | N1 & N12 reappear | X | X | N0 disappears |
| State6 | N1 & N01 reappear | X | X | N1, n2 & N01 reappear | X | X | N0 disappears |
| State7 | X | N1 appears | X | X | X | X | N0 disappears |

FIG. 9A-3

| Next State / Initial State | State8 | State9 | State10 | State11 | State12 | State13 | State14 |
|---|---|---|---|---|---|---|---|
| State8 | X | X | X | N12 reappears | X | X | N0 disappears |
| State9 | X | X | X | X | X | X | N0 disappears |
| State10 | X | X | X | Orbit counter-clockwise | N0 disappears | X | X |
| State11 | N12 disappears | N12 disappears N1 on radial | X | X | X | N0 disappears N0 on radial | N0 disappears |
| State12 | X | X | N0 reappears | X | X | X | X |
| State13 | X | N0 reappears N1 exists N12 is vacant | X | N0 reappears N1, N12 & N2 exist | X | X | X |
| State14 | N0 reappears N1 exists N12 is vacant | N0 reappears N1 exists N12 exists | X | X | X | X | X |

FIG. 9A-4

| FIG. 9A(1) | FIG. 9A(3) |
| FIG. 9A(2) | FIG. 9A(4) |

FIG. 9A-5

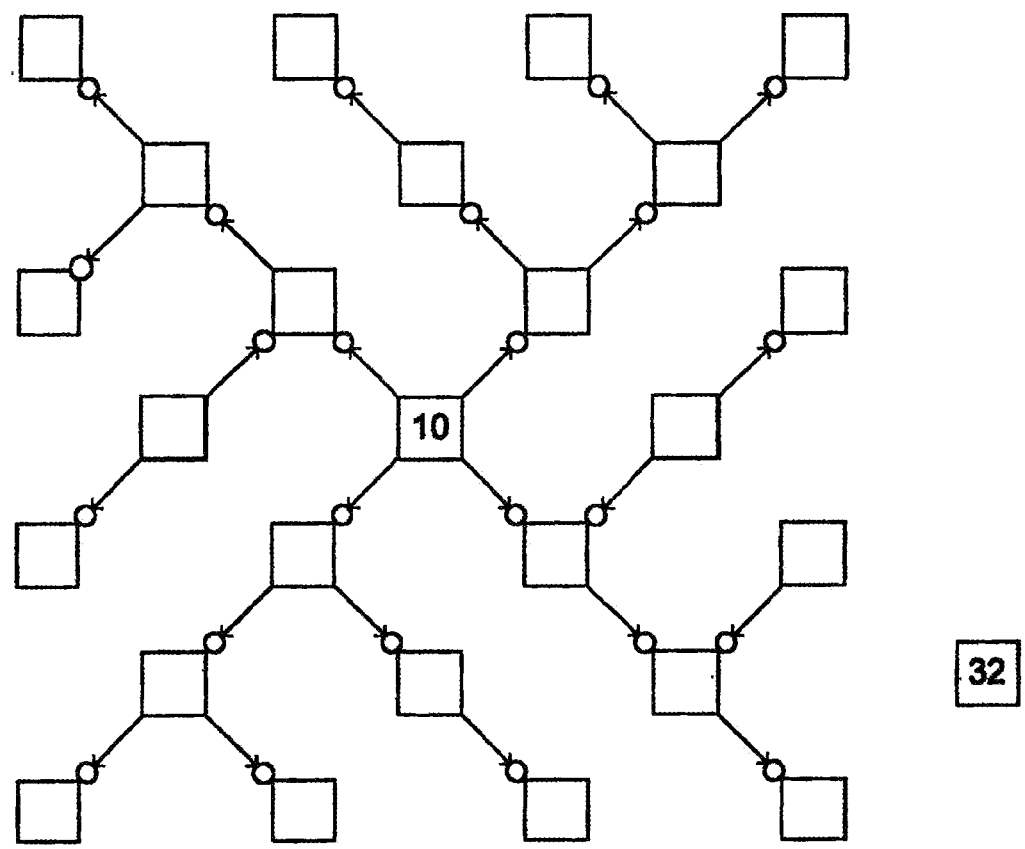
State 1  FIG. 9B

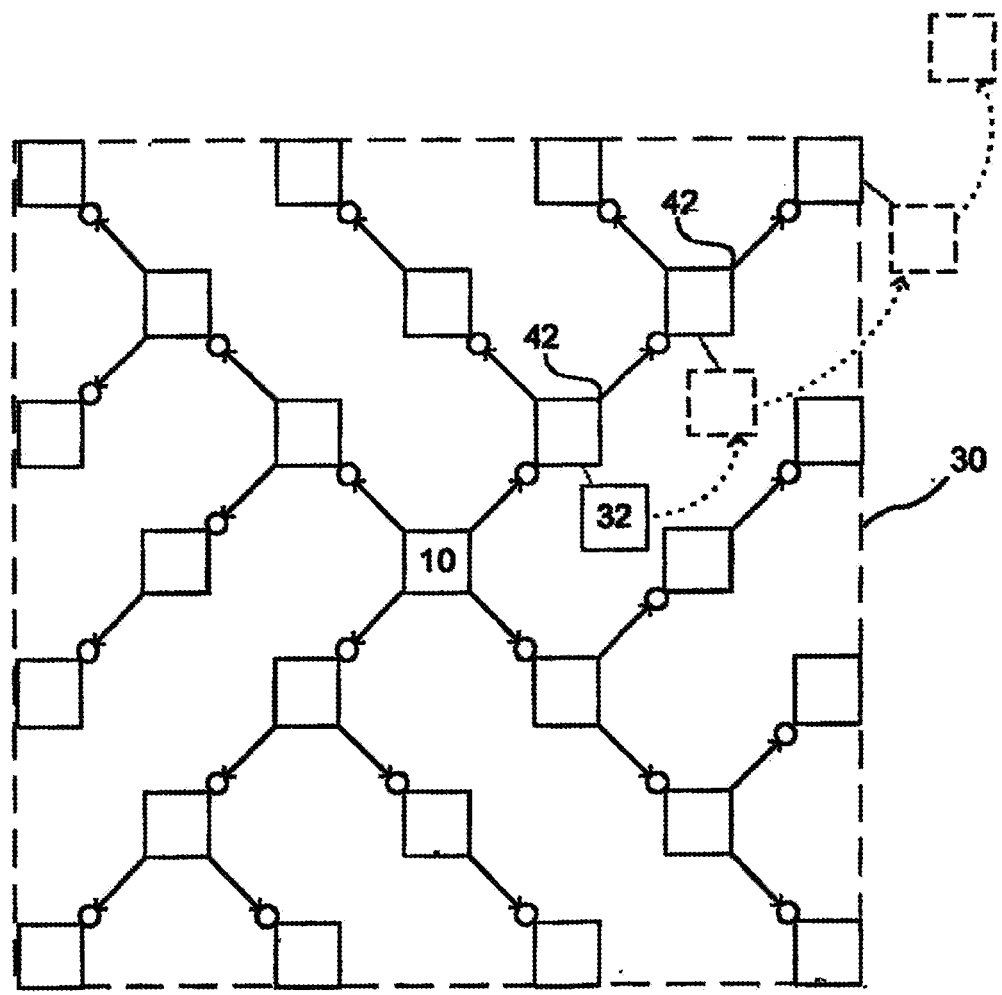
State 2  FIG. 9C

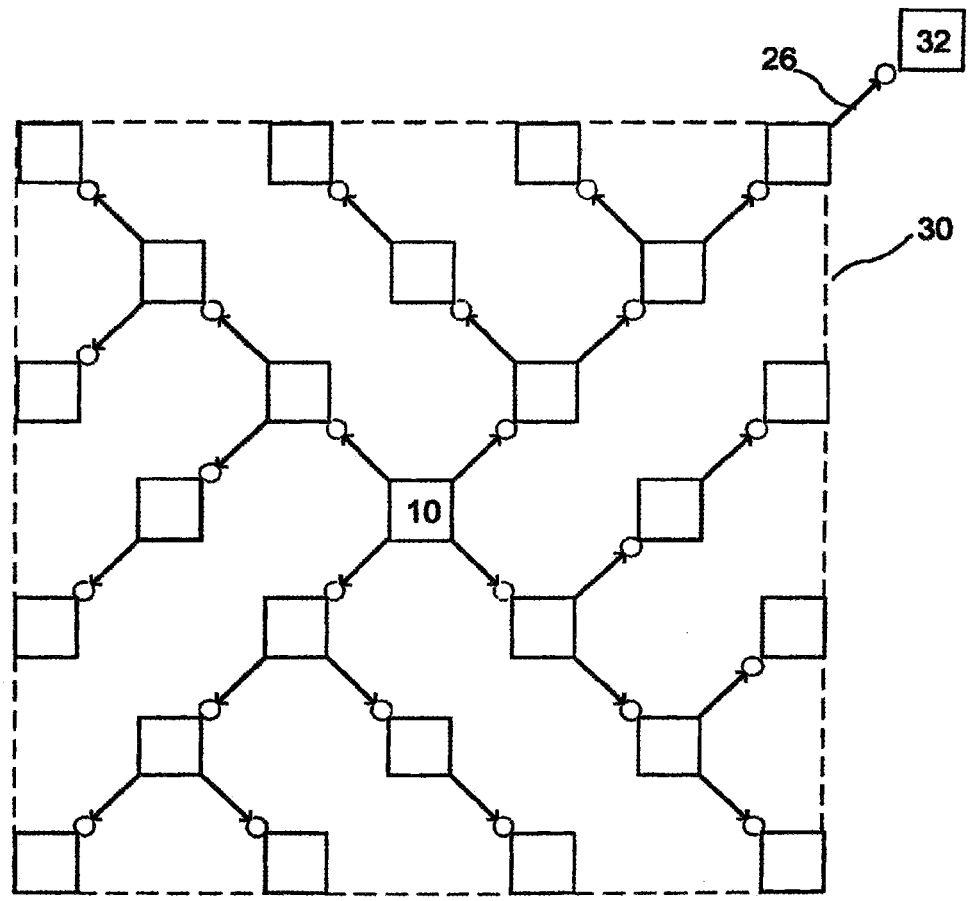
State 3 FIG 9D

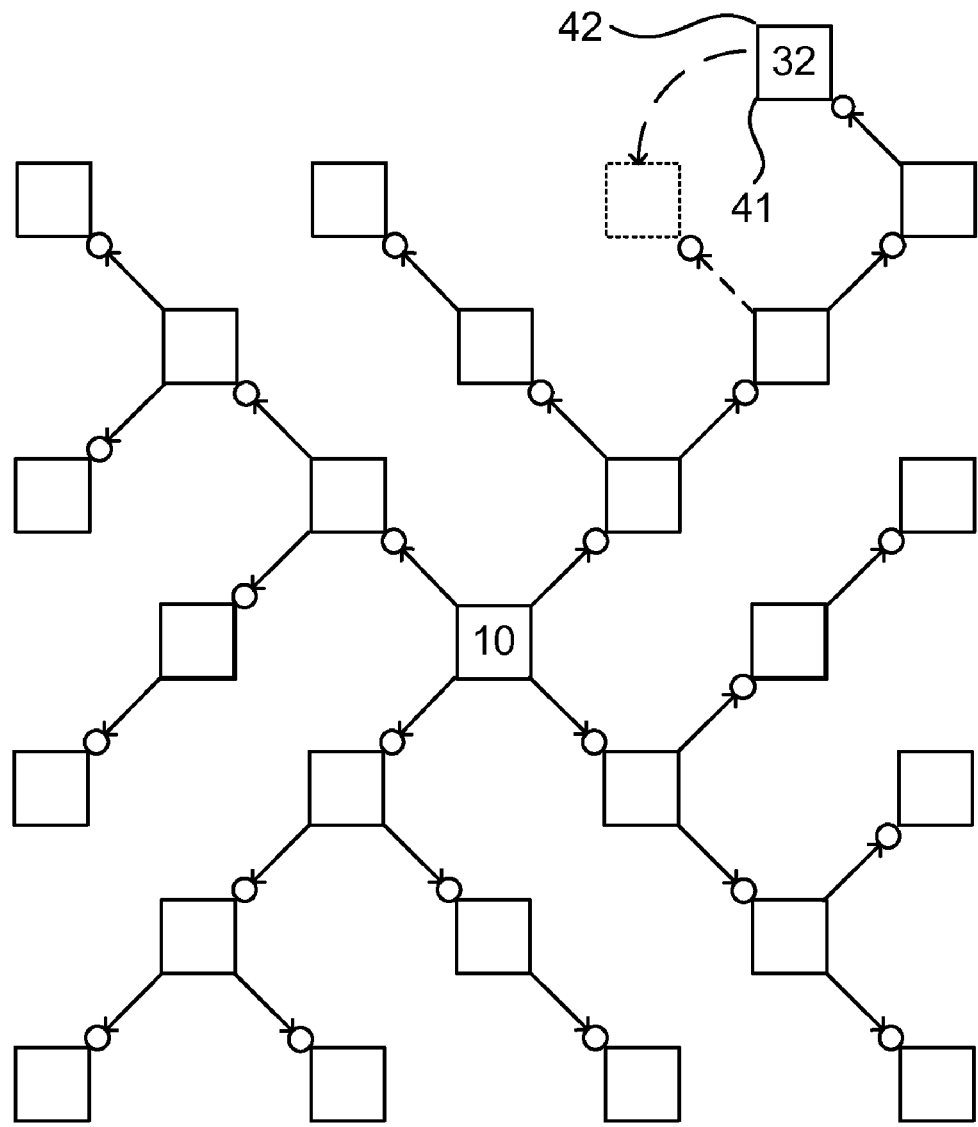
State 4 FIG. 9E

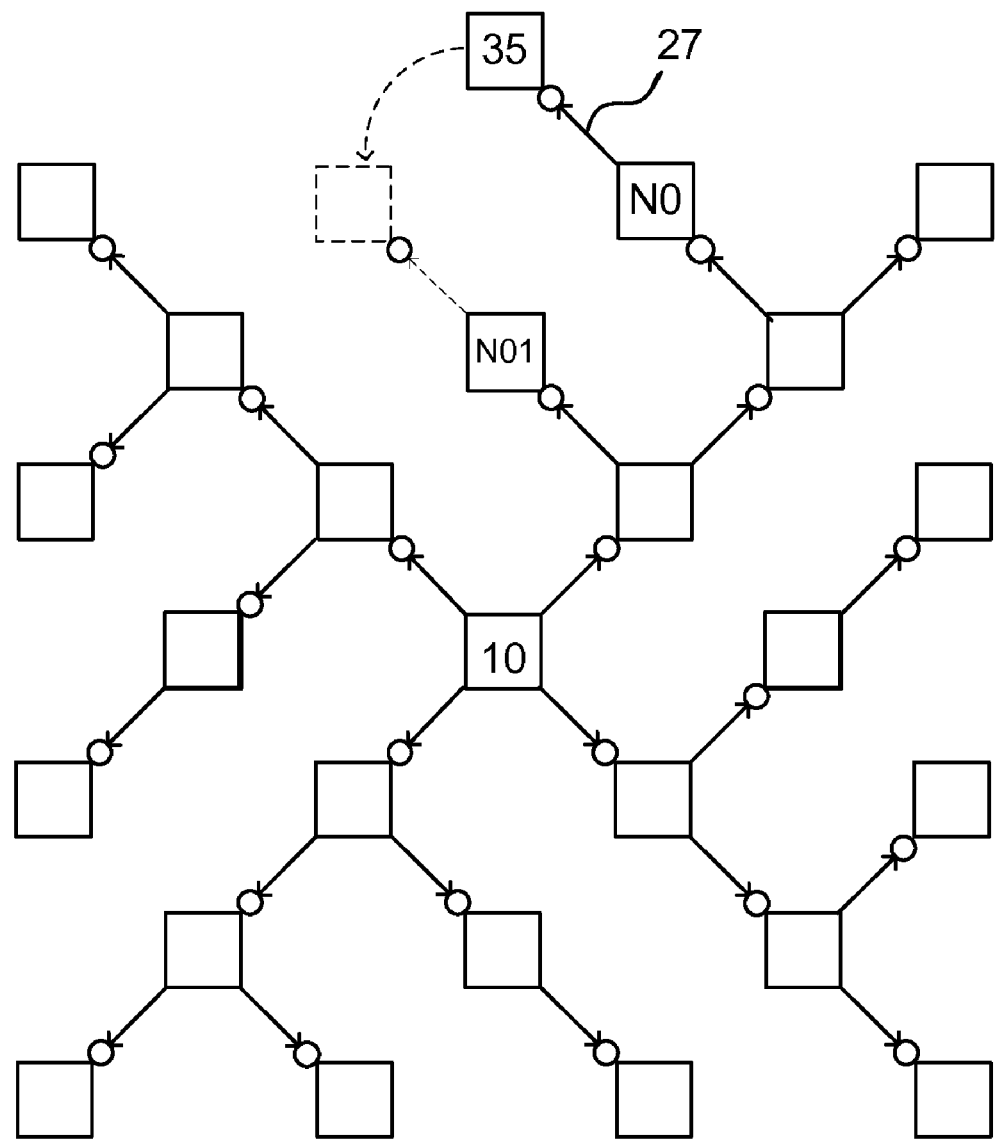
State 5  FIG. 9F

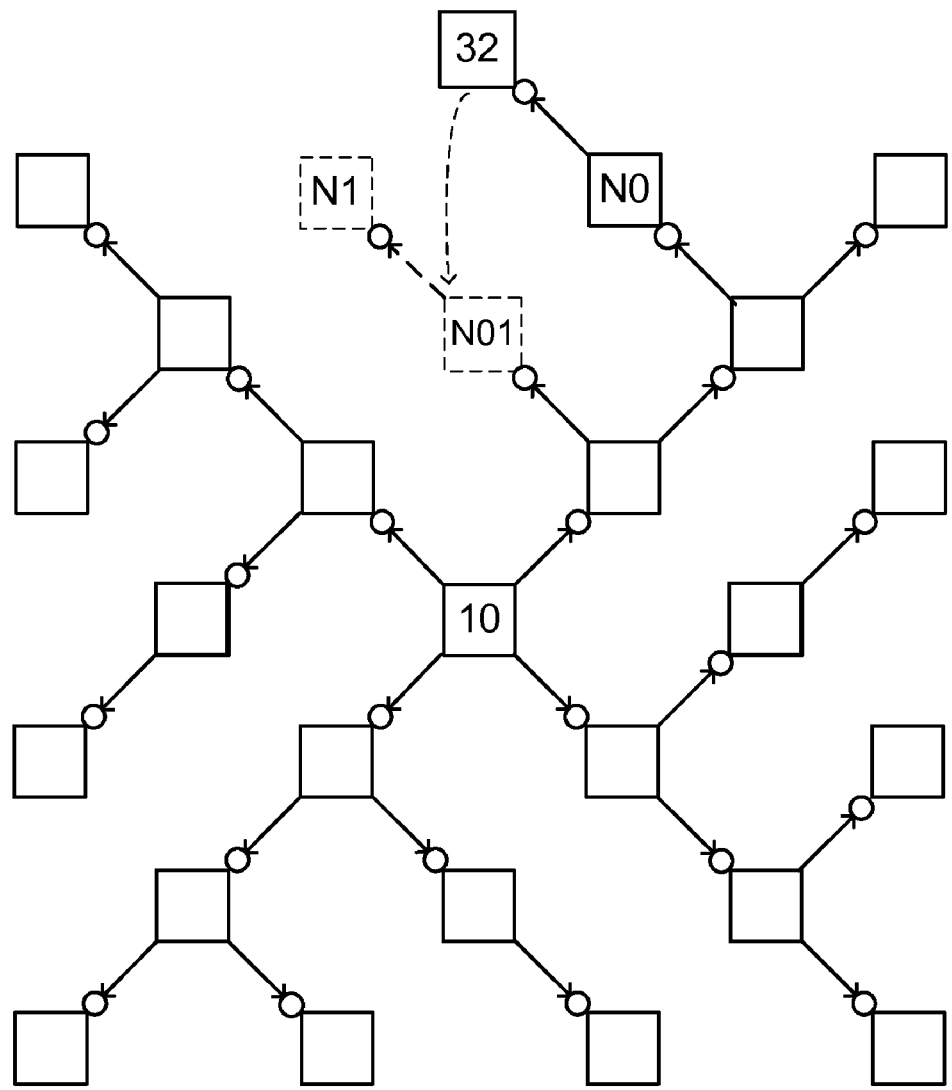
State 6  FIG. 9G

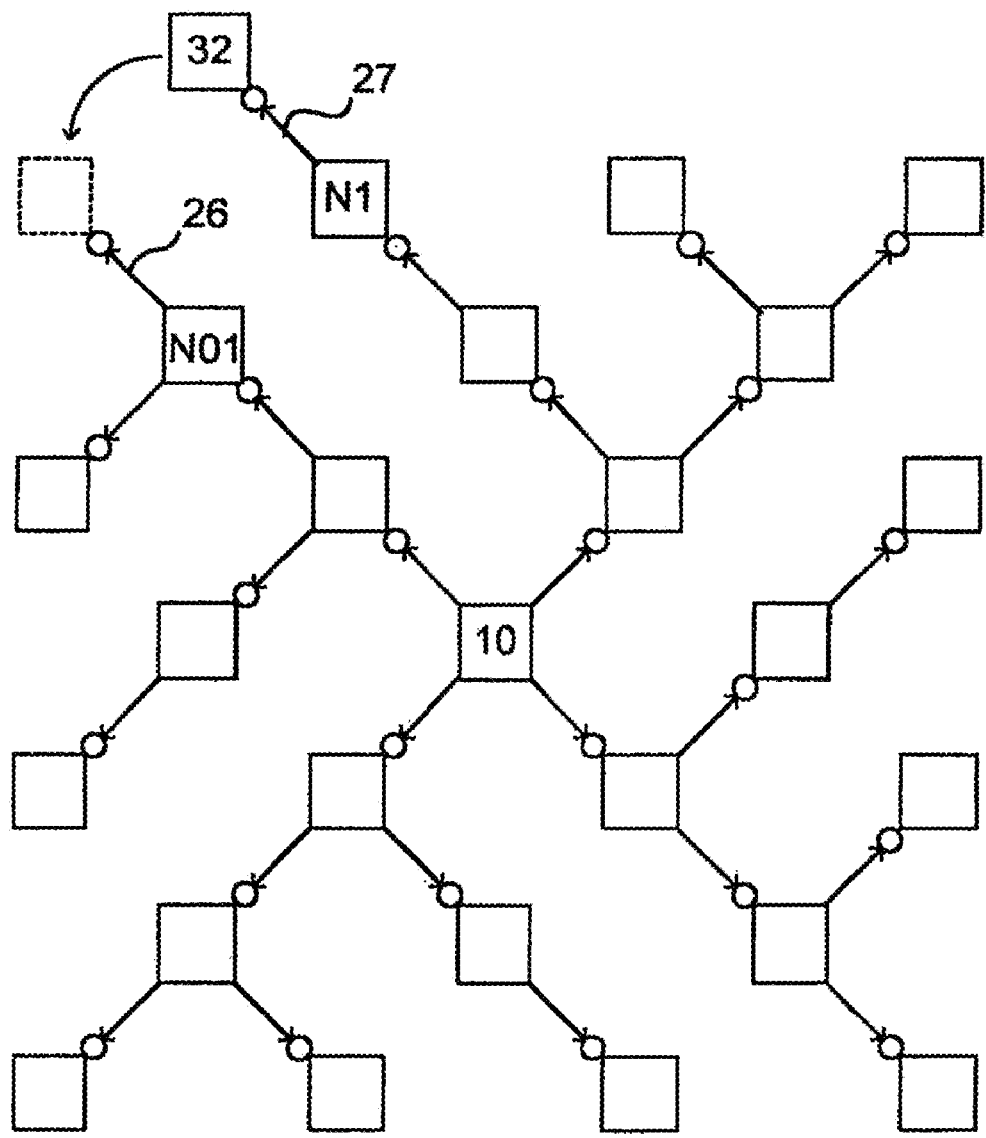
State 7  FIG. 9H

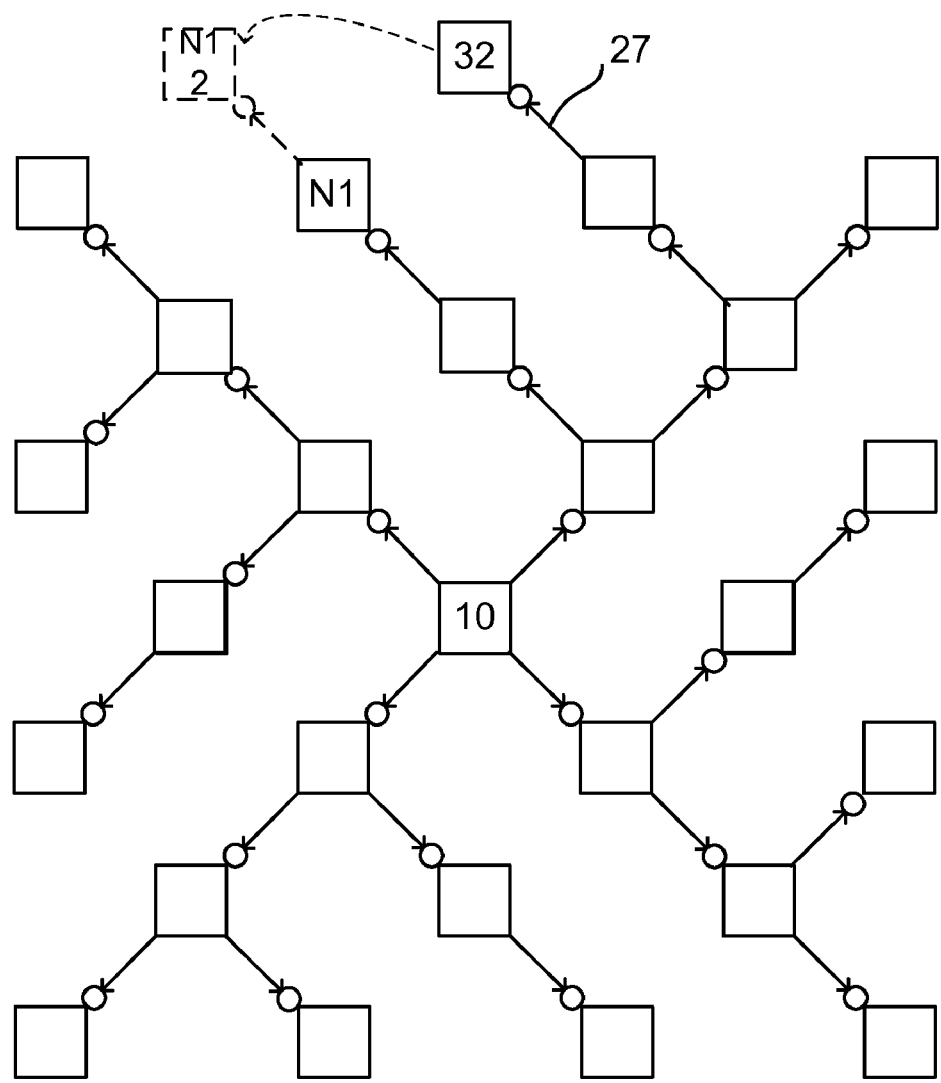
State 8  FIG. 9I

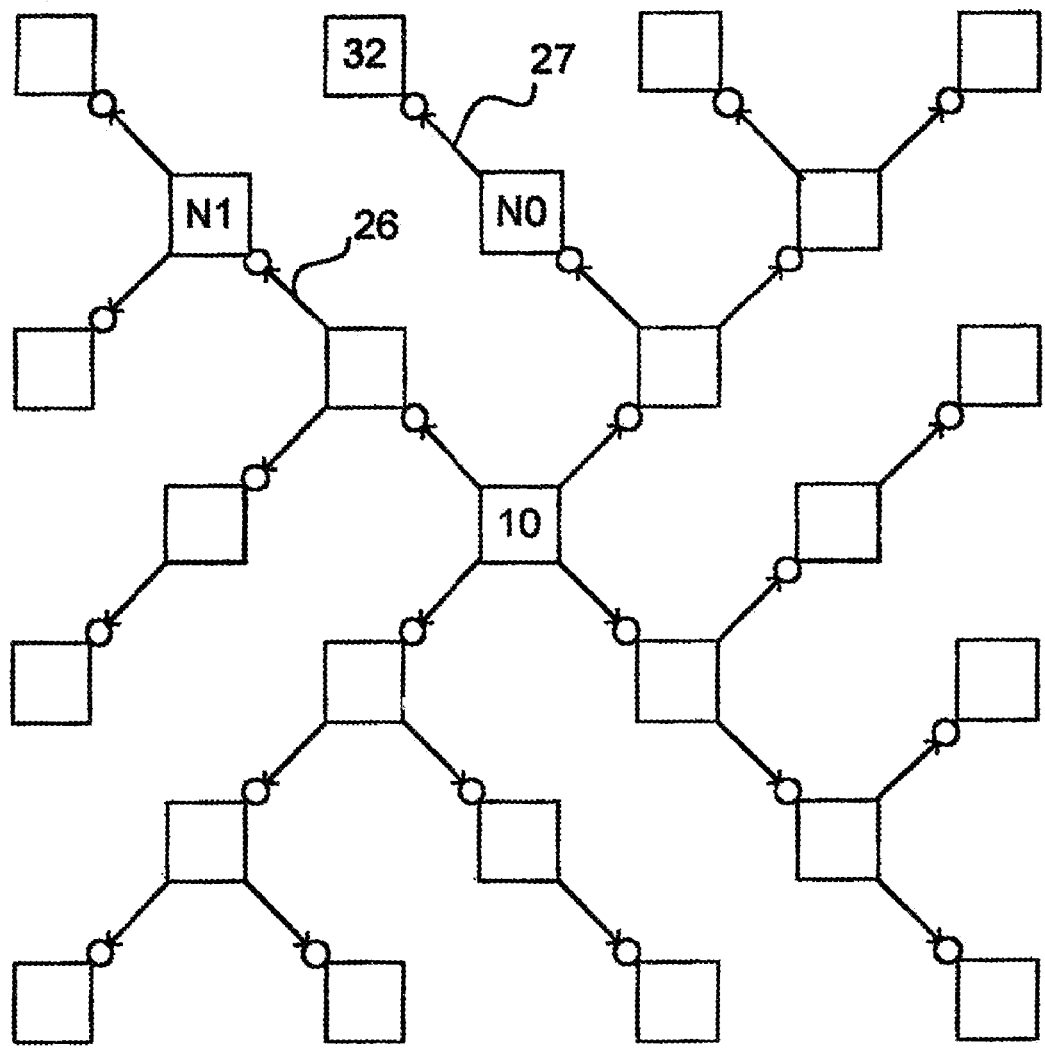
State 9   FIG. 9J

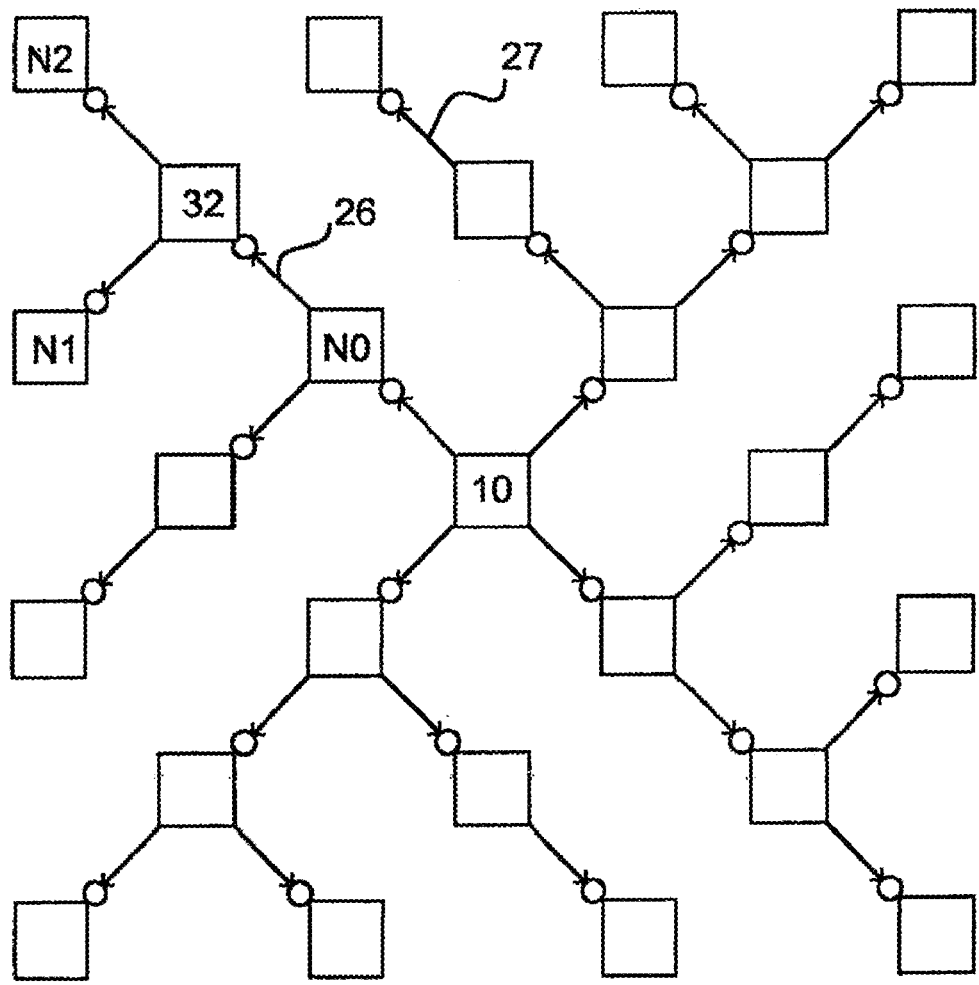
State 10  FIG. 9K

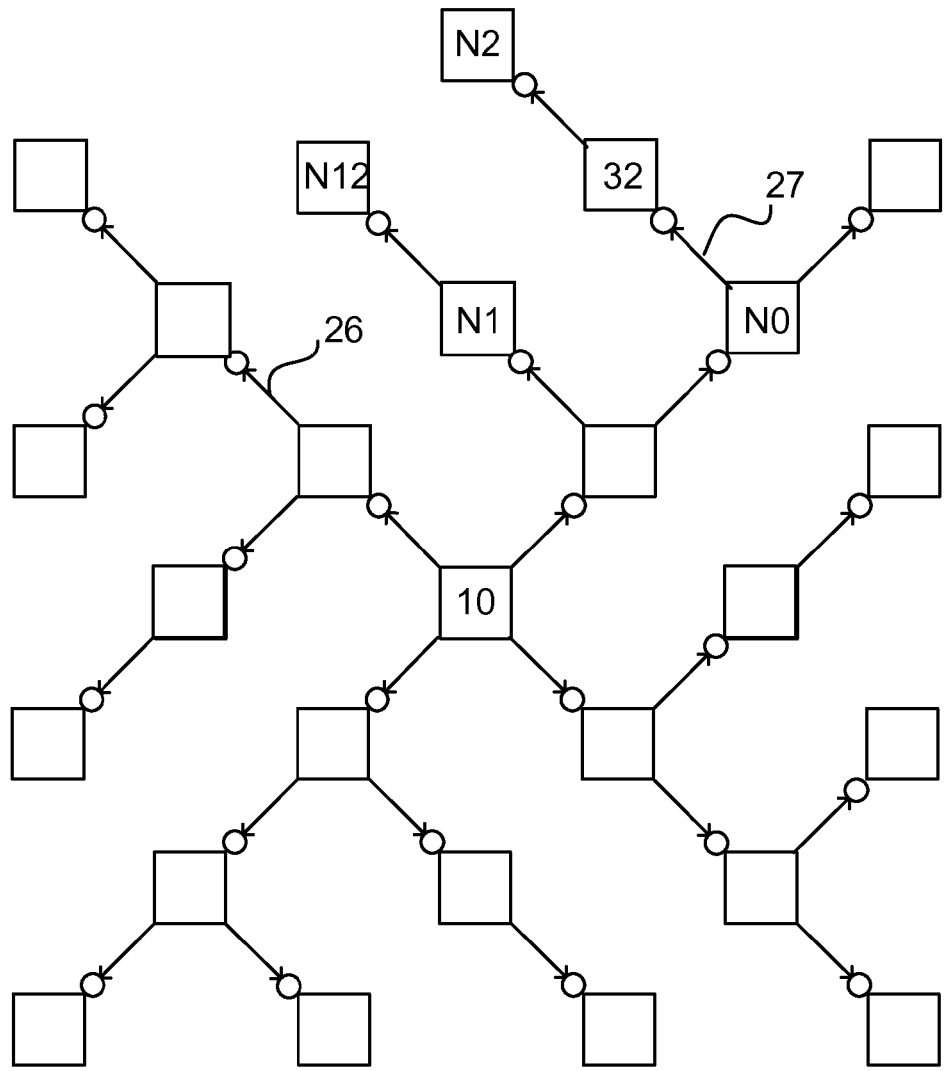
State 11  FIG. 9L

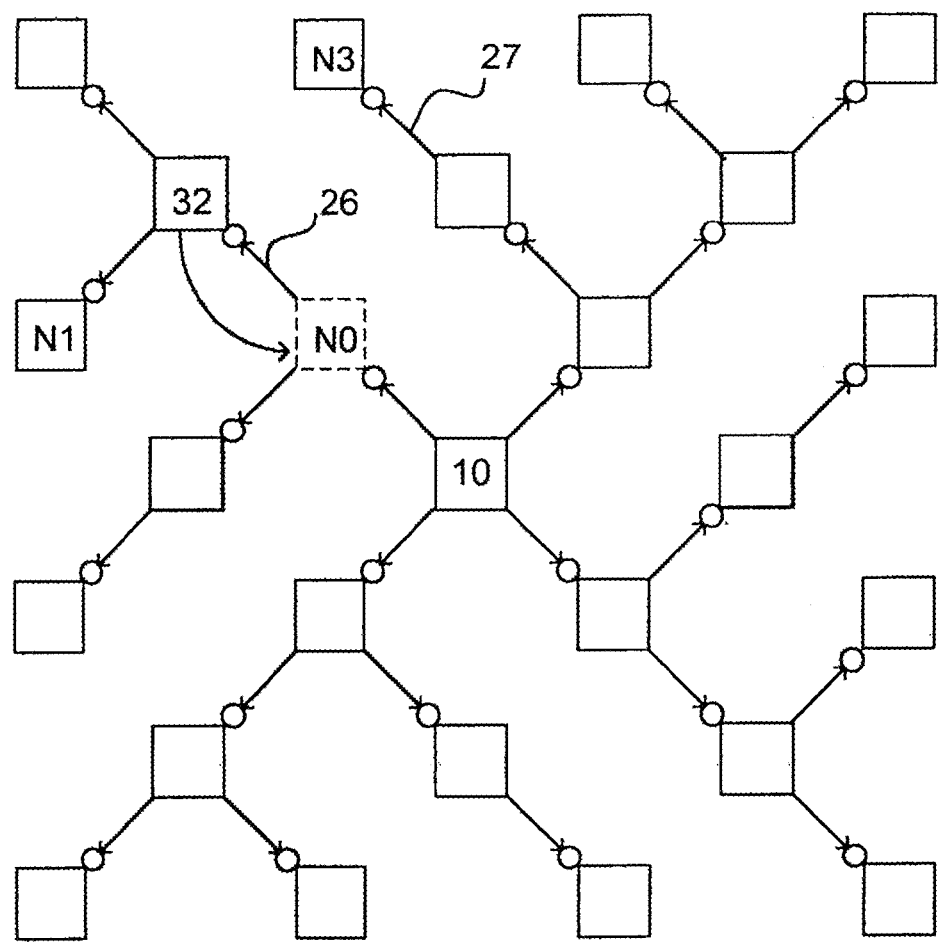
State 12   FIG. 9M

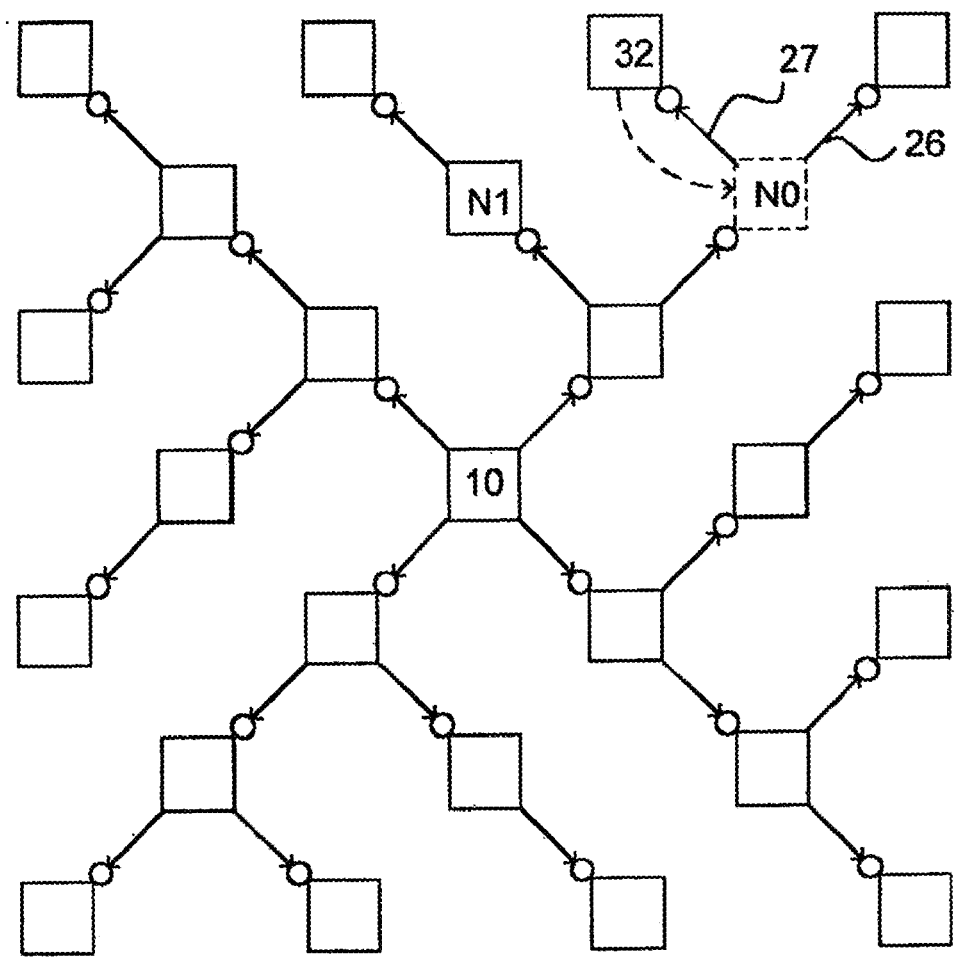
State 13 FIG. 9N

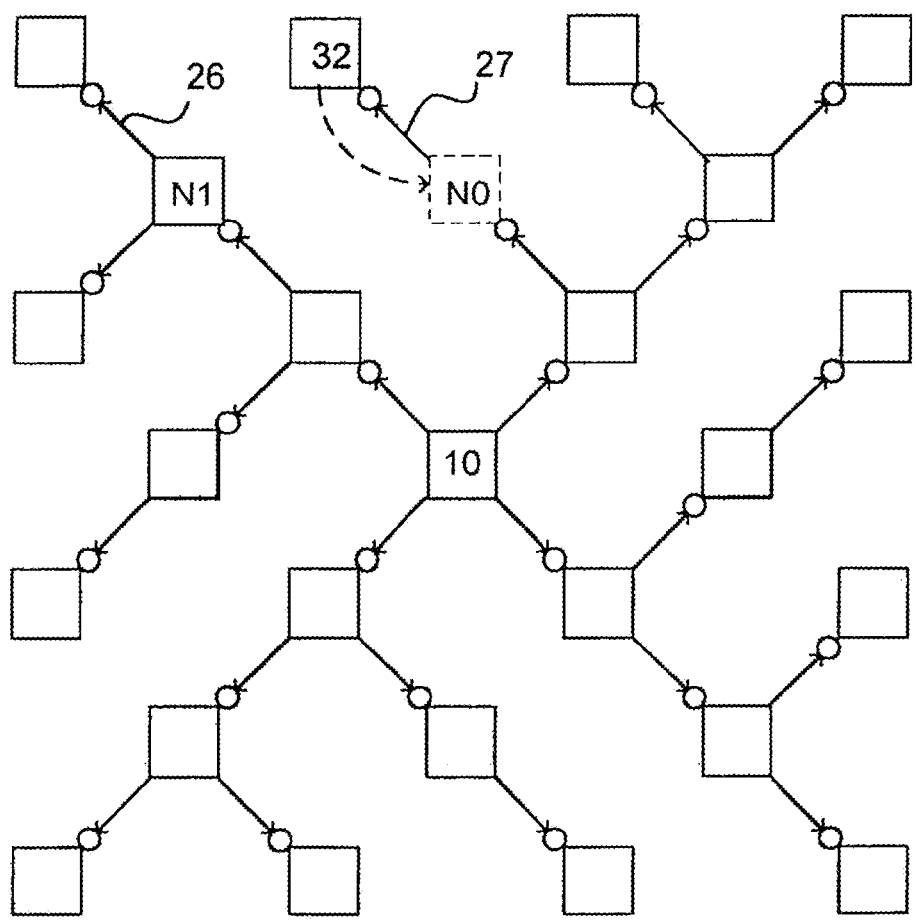
State 14    FIG. 9O

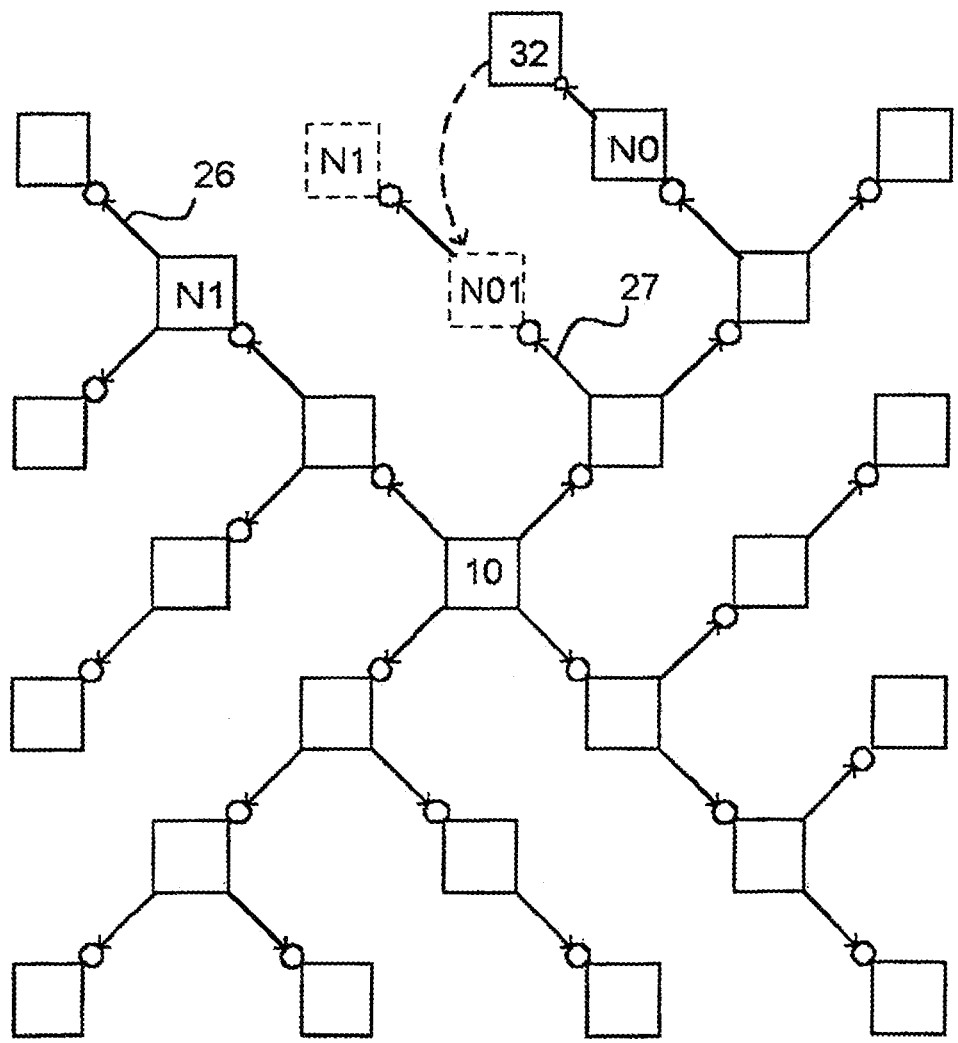
State 15  FIG. 9P

DISTRIBUTED MEANS OF ORGANIZING AN ARBITRARILY LARGE NUMBER OF COMPUTERS

CROSS REFERENCE TO RELATED APPLICATIONS

This application is a divisional of U.S. patent application Ser. No. 11/805,643, filed May 24, 2007 herein incorporated by reference in its entirety (including the Abstract, Specification and Drawings), which is a continuation of and claims the benefit of U.S. patent application Ser. No. 09/887,391, filed Jun. 22, 2001 (abandoned).

BACKGROUND OF THE INVENTION

1. Technical Field of the Invention

This invention relates to the fields of computer communications and computer networking.

2. Description of Related Art

The invention describes a means of coordinating a plurality of computers physically connected to a network.

The invention allows rapid broadcast and search of the hosts using distributed control.

Such a system is an improvement over existing centrally controlled coordination in the areas of security, attack resistance, robustness, speed, and scalability.

Physical vs. Logical Organization

The invention may be used by any computer possessing a means to communicate one to another with all other computers to be coordinated.

The invention works by arranging the physically connected computers into a virtual hierarchy that may be efficiently searched and to which messages may be broadcast.

PRIOR ART

Centralized Control

A collection of computers possessing the ability to communicate one to another may be coordinated by a controlling computer. The controlling computer can maintain a list of network addresses of the computer collection. The controlling computer can maintain a list describing the contents available on each computer in the collection. The controlling computer can also maintain a list a names or other identifying characteristics of each computer in the collection.

The controlling computer may broadcast a message to all the coordinated computers by reading its list of network addresses and creating and sending a message to each computer in the list. The controlling computer may respond to a query regarding the contents available in the collection of computers by searching its list of contents. When a content match is found, the controlling computer can provide the network address of the computer possessing the content.

The controlling computer may respond to a query regarding the name or other identifying characteristic of a computer in the collection by searching its list of names or other identifying characteristics of each computer in the collection. When a match to the computer name or other identifying characteristic is found, the controlling computer can provide the network address of the computer in the collection matching the desired name or other identifying characteristic.

Disadvantages of Centralized Control

1. Scalability
2. Security
3. Failure sensitivity

Scalability

A controlling computer can coordinate a finite number of computers. The amount of computing power increases linearly with the number of computers to be coordinated.

At some point, the controlling computer will be unable to coordinate any more computers and the collection of computers must cease increasing.

Security

All communications between the collection of computer is coordinated by the controlling computer. A successful security attack on the controlling computer will disable all coordinated communications with the collection of computers.

Failure Sensitivity

Similarly, a software failure or hardware failure on the single controlling computer can disable coordinated communications with the entire collection of computers.

PRIOR ART

Hierarchical Organizations

A logical communication hierarchy of computers may be created with a single host at the top of the logical hierarchy and two or more computers at the next level. Each one of the computers at the second level is logically connected to two or more computers. Each of the computers at the third level is logically connected to two or more computers, and so on.

In the simplest case each computer is connected to a single host going up the hierarchy and to two computers going down the hierarchy. The top level of the hierarchy has a single computer. The second level has two computers. The third level has four computers. The fourth level has eight computers. Each successive logical level contains the next power of 2 number of computers.

The total number of computers in the hierarchy is the sum of the computers at each of the N levels in the hierarchy. For example in the simple sample just described, the fifth level would contain 32 computers and the entire hierarchy would contain 63 computers.

The tenth level of a ten level hierarchy would contain 1024 computers and the entire hierarchy would contain 2047 computers. The equation describing the total number of computers in such a network is 2*(2 power N)−1. Where N is the number of levels.

Advantage of Hierarchical Organizations

A virtual hierarchy such as that described above may broadcast a message from the top level computer to all computers in the hierarchy is an amount of time equivalent to:

N*(average message transit time).

For example, in an Internet environment, the message delay might be 10 msec. To broadcast a message to all computers in a ten level hierarchy containing 2047 computers would take 100 msec.

To broadcast a message to all computers in a twenty level hierarchy containing 2,097,151 computers would take only 200 msec.

Without a hierarchy, serially sending a message to 2 million computers would require 2,097,151*(average message transit time).

Disadvantages of Hierarchical Organization

1. Inflexibility
2. Insecurity
3. Failure sensitivity

Inflexibility

A hierarchy is great for broadcasting a message from a constant fixed computer to a hierarchy of constant fixed computers. Should a message require broadcasting from any other computer than that at the top of the hierarchy, other mechanisms must be used such as passing the message upward to the top and then broadcasting it downward from the top of the hierarchy.

Insecurity

A hierarchy is progressively more vulnerable to disruption the closer to the top of the hierarchy one gets. In fact, if an attack were launched on the top computer of the hierarchy rendering it inoperable, the entire hierarchy would be rendered inoperable.

Failure Sensitivity

Similarly, each computer in a hierarchy is connected to two or more computers beneath it. Each of them is connected to two or more computers and so on. Should a single computer in a hierarchy fail, all the computer connected beneath it in the hierarchy would be unable to communicate.

SUMMARY OF THE INVENTION

Some of the objectives of the invention are to provide a collection of computers with:

(a) the ability to perform one to many broadcast originating from any computer in the collection without requiring a fixed hierarchical organization;

(b) the ability to search all computers in the collection for specific content without requiring a central controlling computer;

(c) the ability to locate a specific computer in the collection using a name or other identifying characteristic without requiring a central controlling computer;

(d) the ability to self organize itself so broadcast and searching may be performed in an optimal manner;

(e) the ability to self organize itself in the presence of changing computer network addresses so broadcast and searching may be performed in an optimal manner;

(f) the ability to continue broadcast and searching functions in the presence of a security attack which disables a plurality of computers in the collection.

(g) the ability to repair itself and continue broadcast and searching functions in the presence of simultaneous failure of a plurality of computers in the collection.

Further objectives will become apparent from a consideration of the ensuing description and drawings.

BRIEF DESCRIPTION OF THE DRAWINGS

For a more complete understanding of the present invention, reference is made to the following detailed description taken in conjunction with the accompanying drawings wherein:

FIG. 6 shows the progression of a broadcast message originating from the top computer of the hierarchy.

FIGS. 9A-1 to 9P show the self organizing states of a quadrilateral configuration for the collection of computers.

Figure 1A:
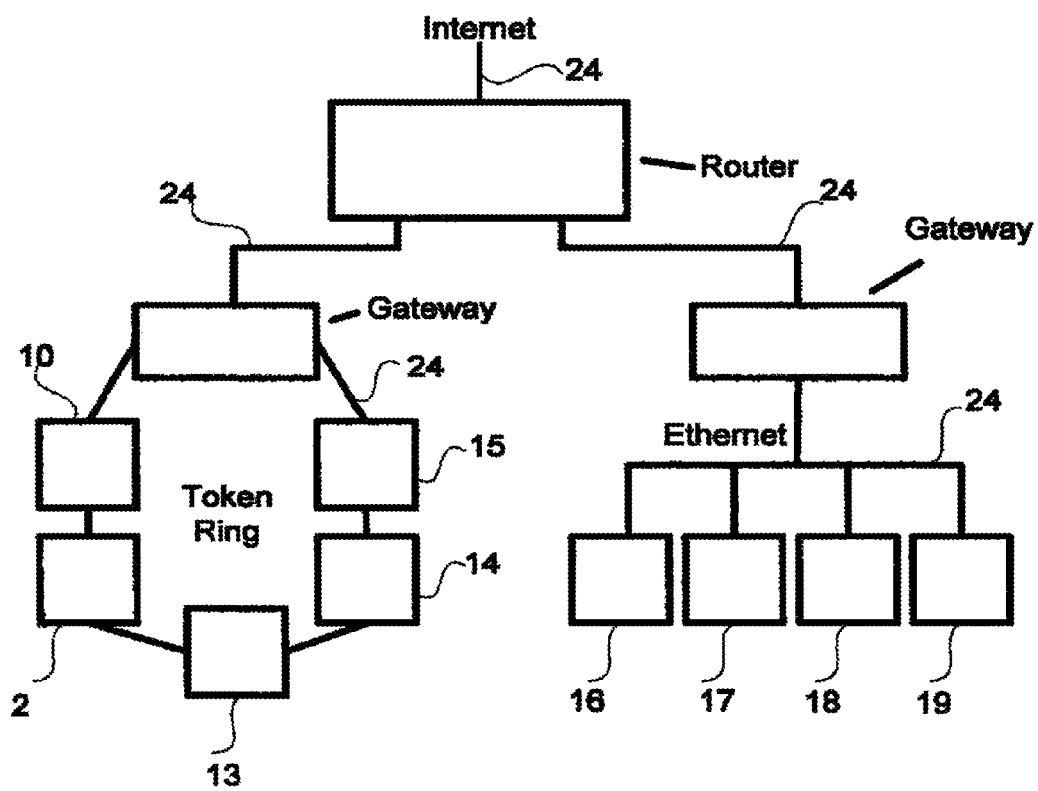
FIG. 1A to 1B show a typical physical means of computers communicating one to another compared to a logical means of communicating for the same computers.

| Reference Numerals in Drawings | | | |
|---|---|---|---|
| 10 | logical middle of the collection of computers | | |
| 11 | top computer of a hierarchy | | |
| 12, 13, 14, 15, 16, 17, 18, 19, 20, 21, 22, 23 computers | | | |
| 24 | physical means of communication | 25 | logical means of communication |
| 26 | radial | 27 | indirect radial |
| 28 | found computer | 29 | disabled computer |
| 30 | collection edge | 31 | logical connection |
| 32 | new computer | 33 | caching computer |
| 34 | searching computer | | |
| 40 | head | 41 | right hand |
| 42 | toe | 43 | left hand |
| 44 | WEBcast server | 45 | WEBcast player |

DETAILED DESCRIPTION OF THE INVENTION

Reference is now made to the Drawings wherein like reference characters denote like or similar parts throughout the various Figures.

Figure 1B:
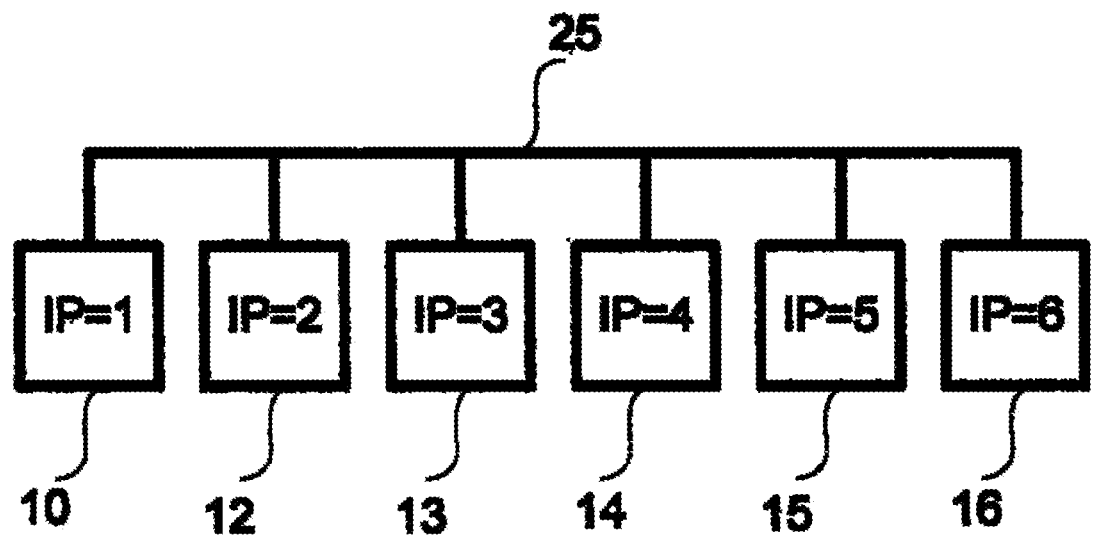
Figure 2:
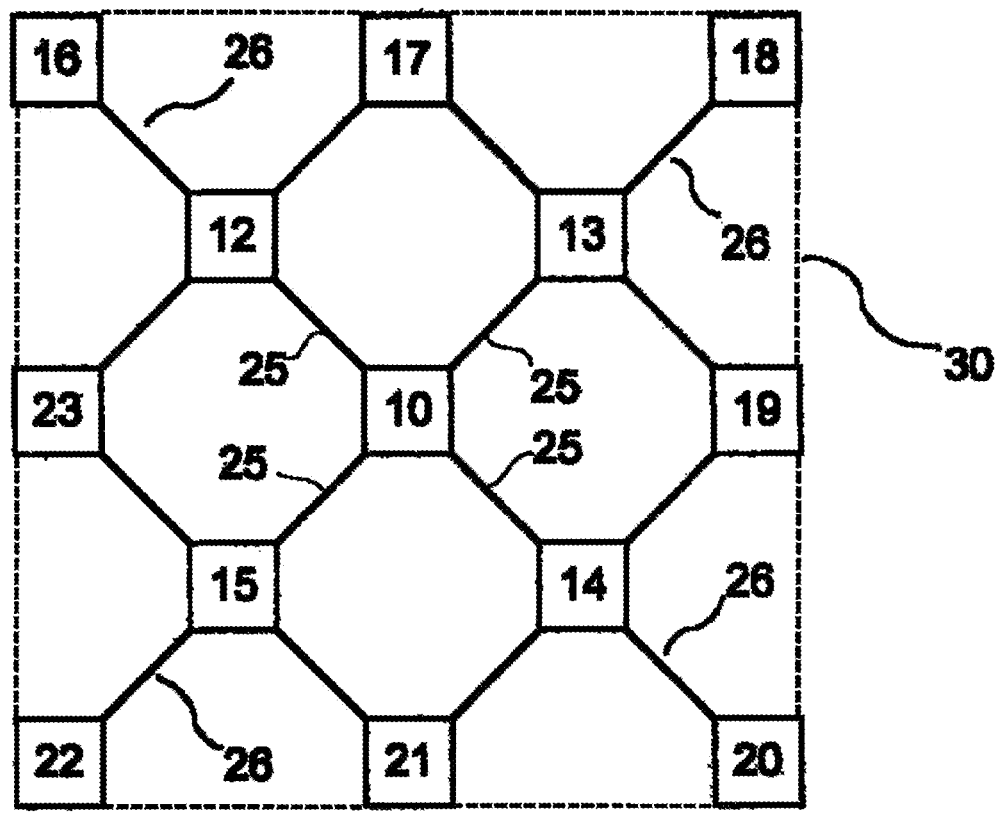
FIG. 2 shows a typical embodiment of the invention using a quadrilateral configuration for the collection of computers.

Description—FIGS. 1 to 3

Each computer 10,12,13,14,15 in the collection possesses a physical means 24 to communicate one to another as illustrated in FIG. 1A. The physical means of communication may be reorganized to produce a logical means to communicate 25 one to another as illustrated in FIG. 1B.

In an Internet embodiment, FIG. 1A would consist of computers physically connected via local area networks, routers, and the Internet backbone. In an Internet embodiment, FIG. 1B would consist of computers logically connected via (IP) Internet Protocol addresses.

The present invention is primarily directed to the logical configuration of a computer network, irrespective of the particular physical means of communication between computers in the network. A typical embodiment of the invention in a quadrilateral configuration is illustrated in FIG. 2. The logical middle 10 of the collection possesses a logical means to communicate 25 to four neighbor computers 12,13,14,15 that comprise a concentric square. Each computer in the collection possesses a logical means to communicate 25 to four neighbors. The concentric square consisting of four computers 12,13,14,15 is in turn logically connected with the concentric square consisting of eight computers 16,17,18,19,20, 21,22,23. The collection of computers ends at the collection edge 30.

Figure 3A:
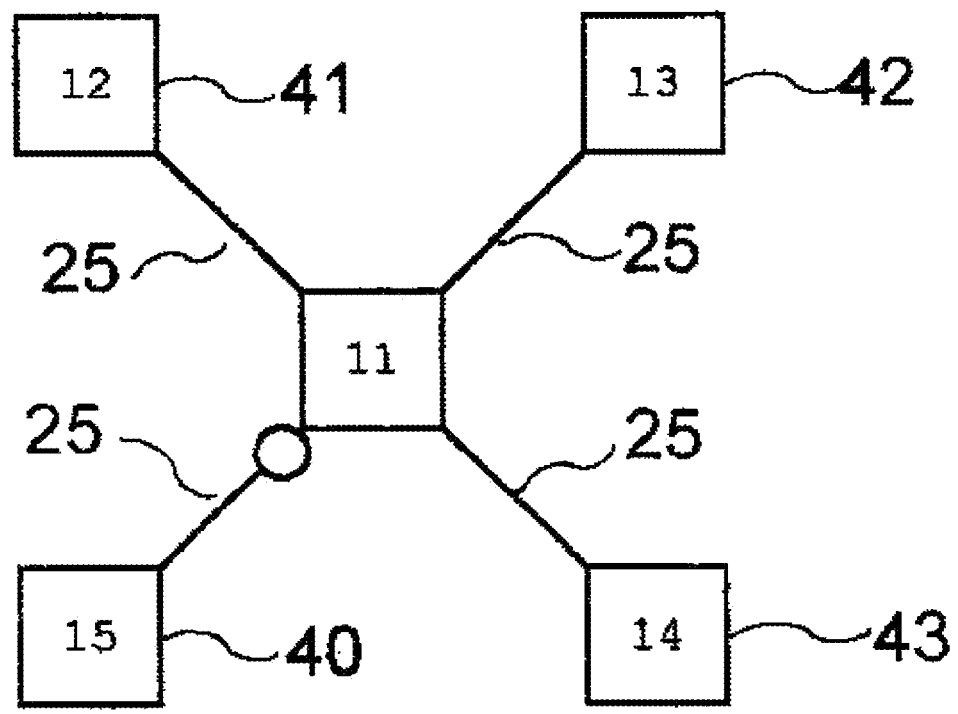
FIGS. 3A and 3B show a computer's neighbors and the linking of neighbors in the collection of computers.

The logical means to communicate 25 is defined by a neighbor relationship. Each computer possesses links to four neighbors. FIG. 3A illustrates each computer's neighbors as neighbor0, 40, neighbor1 41, neighbor2 42, and neighbor3 43. Neighbor1 41 is to the right of (or counterclockwise from) neighbor° 40, neighbor2 42 is to the right of (or counterclockwise from) neighbor1 41, and neighbor3 43 is to the right of (or counterclockwise from) neighbor2 42.

Figure 3B:
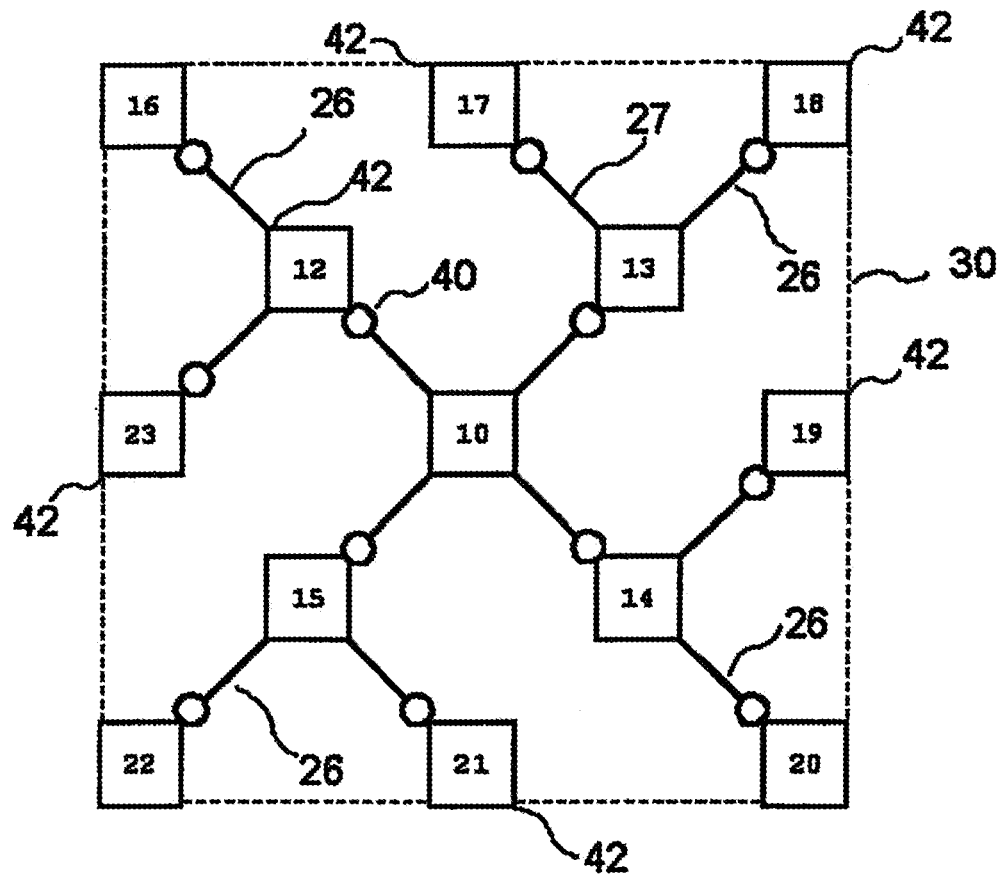

In FIG. 3B the neighborOs 40 of four computers 12,13,14, 15 point to the logical center 10 of the collection. The neighbor2s 42 of these computers 12,13,14,15 point to four more computers 16,17,18,19,20,21,22,23 and so on.

The neighbor2 42 to neighbor° 40 configuration of the computers emanating from the logical center 10 of the collection may be considered radials 26. The radials 26 pass through the computers at the vertices of the concentric quadrilaterals. The neighborOs 40 of computers on a radial point toward the logical middle of the collection of computers. The neighbor2s 42 of computers on a radial point toward the collection edge 30.

The neighbor 41 of every computer on a radial 26 point to a line of neighbor2 42 to neighbor° 40 relationships which form indirect radials 27. The neighborOs 40 of computers on an indirect radial 27 point toward a radial 26. The neighbor2s 42 of computers on an indirect radial 27 point toward the collection edge 30. Generally, the neighbor relationships are used for logically organizing the computers, while the radials 26 and indirect radials are used for disseminating information throughout the collection of computers.

Figure 4:
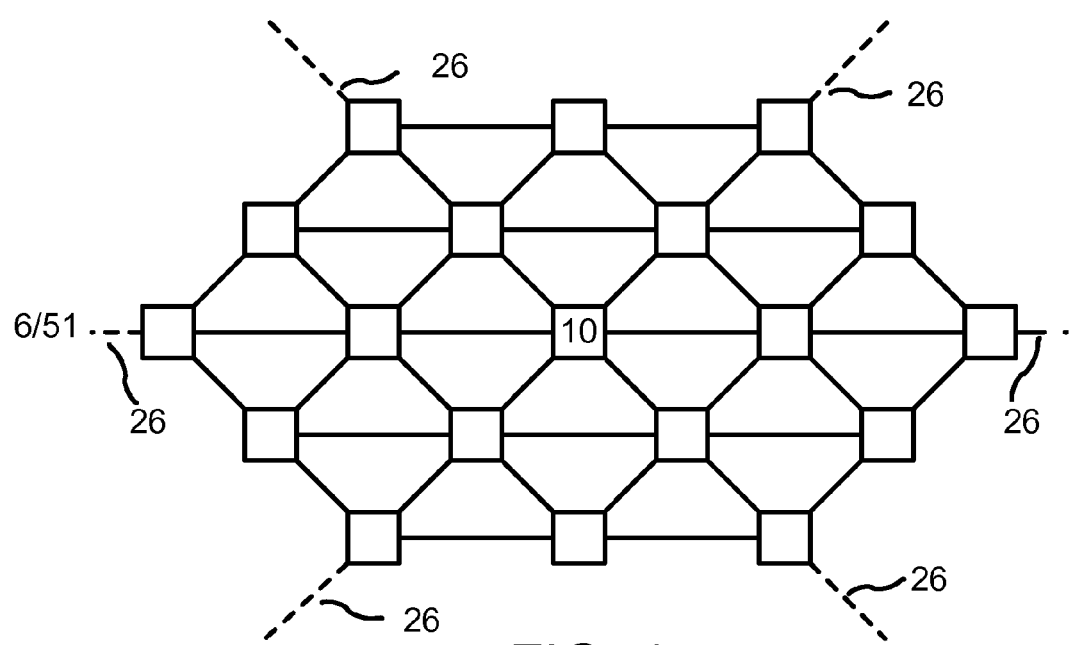
FIG. 4 shows a typical embodiment of the invention using a hexagonal configuration for the collection of computers.

A typical embodiment of the invention in a hexagonal configuration is illustrated in FIG. 4. As will be appreciated by persons of ordinary skill in the art, the hexagonal configuration possesses six radials 26 emanating from the logical center 10 of the collection, while indirect radials 27 generally emanate from a neighbor 2 (out of a total of six neighbors) of every computer on a radial 26. Although the invention is described in connection with a quadrilateral or hexagonal configuration, configurations with any even plurality of sides are possible in accordance with the invention. Three dimension configurations are also possible. The more sides in the configuration, the more states exist in managing the collection of computers and the faster the broadcast and search of the entire collection may be performed. In any event, it will be recognized that, among other things, the orientation of the indirect radial depends on the particular configuration.

Operation—FIGS. 5 to 7

Figure 5A:
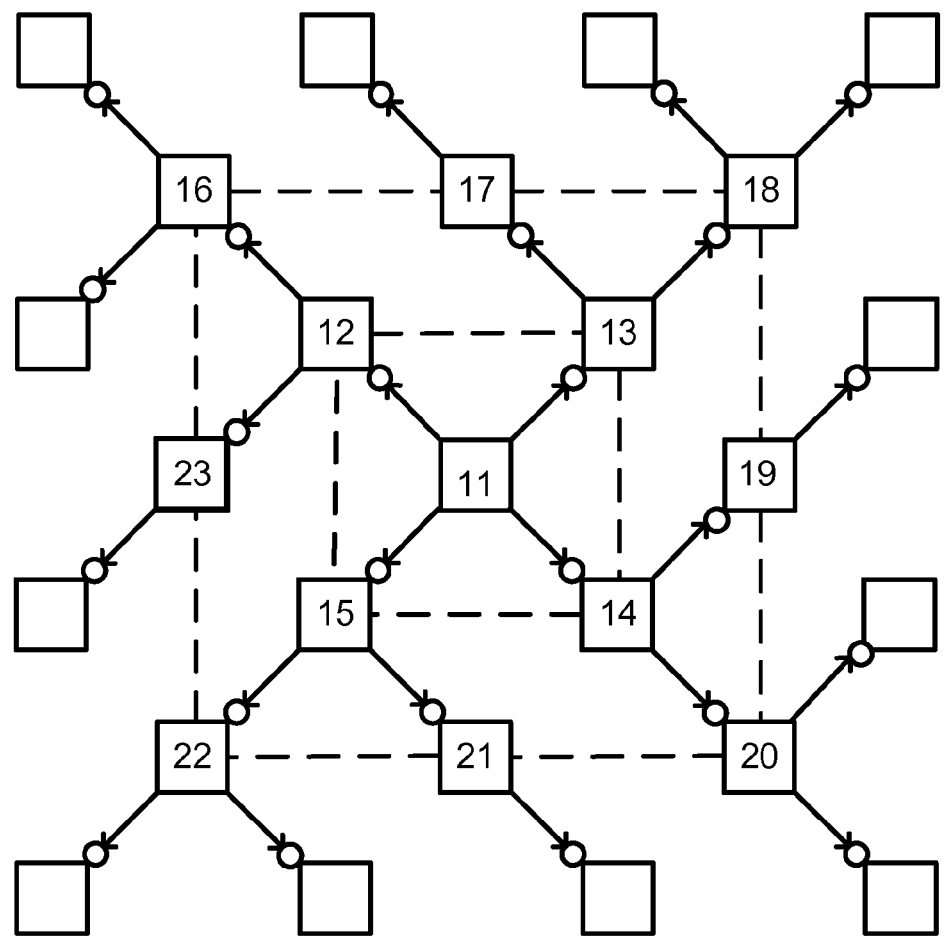
FIGS. 5A to 5C show the virtual hierarchy created by a typical embodiment of the invention using a quadrilateral configuration for the collection of computers.

The invention creates a logical organization in which each and every computer in the collection appears to be at the top of a hierarchy formed by concentric polygons. For purposes of describing the invention, the logical middle 10 of the collection of computers corresponds to the geometrical center, while the top computer 11 in the hierarchy represents a location at which a search or broadcast originates. As a result, the top computer 11, at any given time, changes based on which computer in the overall hierarchy is acting as a source of a broadcast, search, or other dissemination of information throughout the network or a portion thereof. FIG. 5A illustrates a hierarchy emanating from the top computer 11 in the hierarchy through a collection of computers 12,13,14,15,16, 17,18,19,20,21,22,23 organized into concentric squares. In the example illustrated by FIG. 5A, the top computer 11 in the hierarchy is also the logical middle 10 of the collection of computers.

In the case of the quadrilateral configuration, the number of computers in the concentric squares increases by four from concentric square to concentric square. The first square surrounding the top computer 11 in the hierarchy contains four computers 12,13,14,15. The next concentric square contains eight computers 16,17,18,19,20,21,22,23. The next concentric square contains twelve computers, and so on.

Figure 5B:
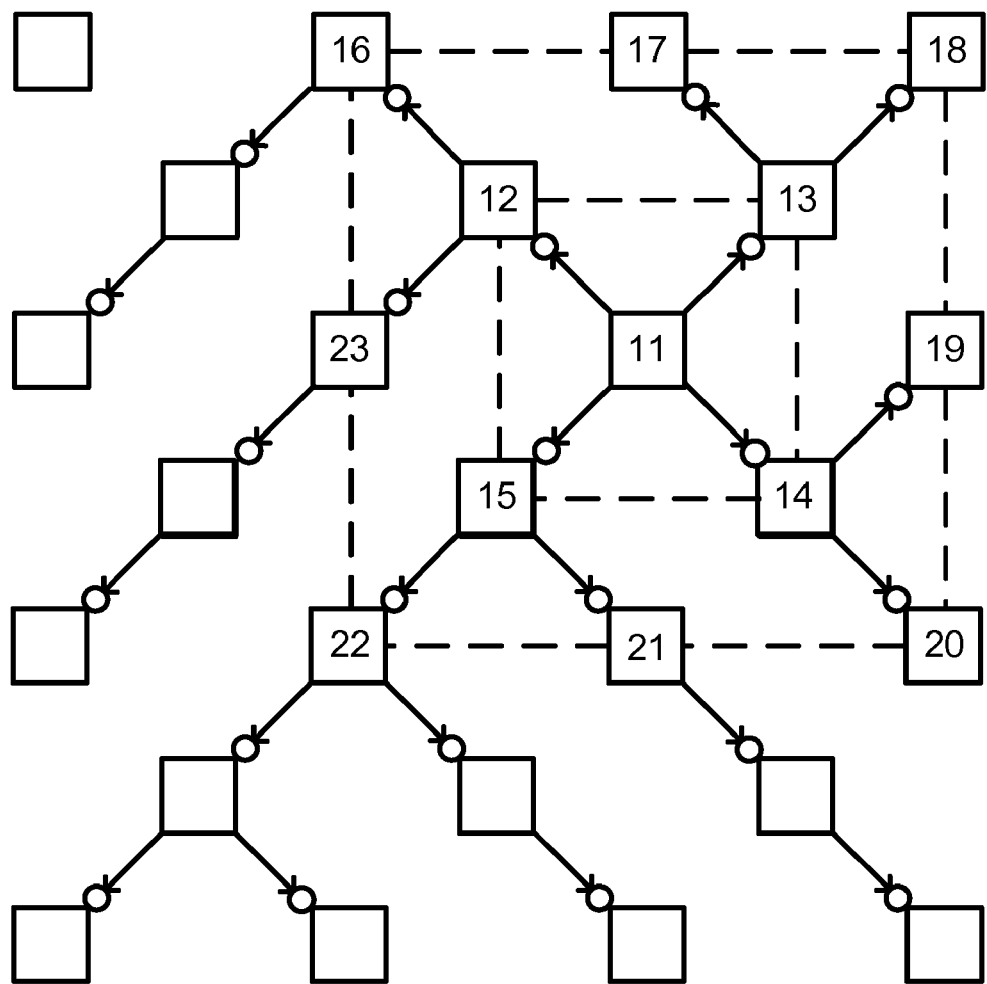

FIG. 5B illustrates a hierarchy emanating from the top computer 11 in the hierarchy through a collection of computers 12,13,14,15,16,17,18,19,20,21,22,23 organized into concentric squares. In the example illustrated by FIG. 5B, the top computer 11 in the hierarchy is not the logical middle 10 of the collection of computers. The number of computers in the concentric squares increases by four from concentric square to concentric square. The first square surrounding the top computer 11 in the hierarchy contains four computers 12,13, 14,15. The next concentric square contains eight computers 16,17,18,19,20,21,22,23. The next concentric square (not fully shown) contains twelve computers, and so on.

Figure 5C:
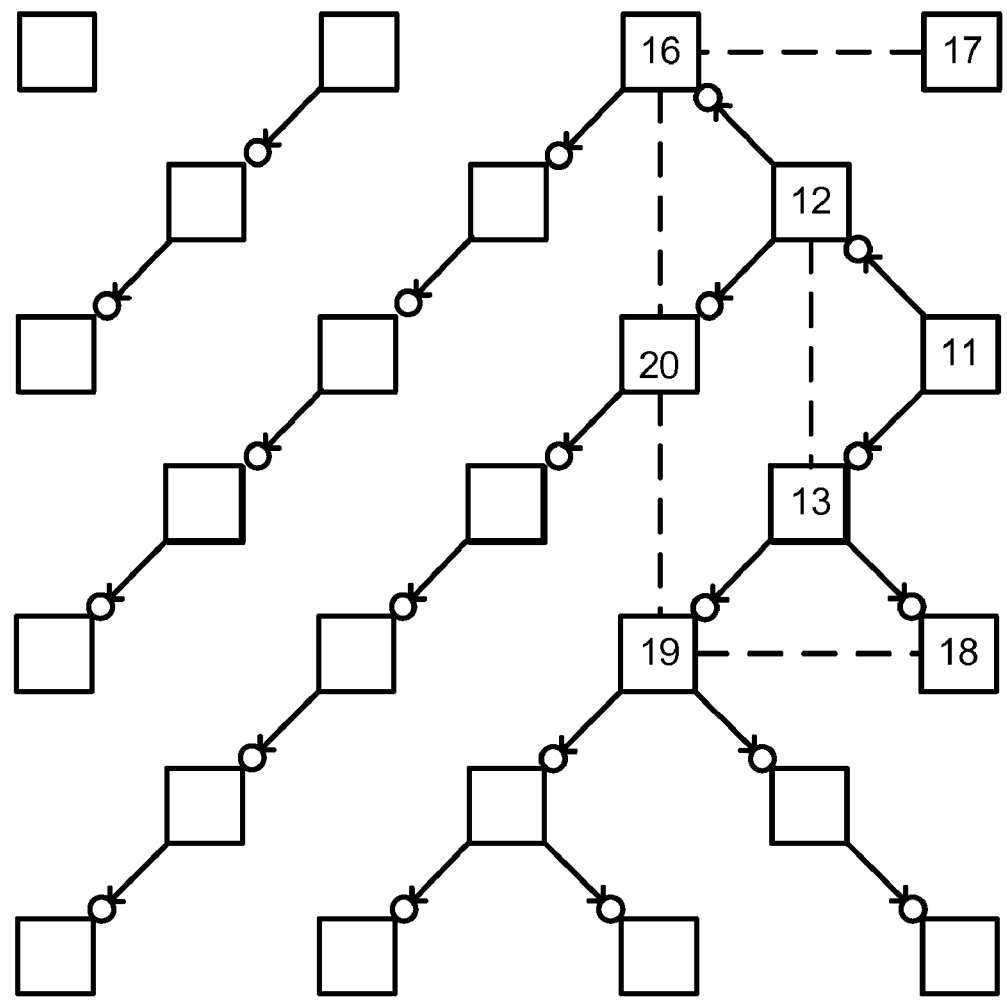

FIG. 5C illustrates a hierarchy emanating from the top computer 11 in the hierarchy through a collection of computers 12,13,14,15,16,17,18,19,20,21,22,23 organized into concentric squares. In the example illustrated by FIG. 5C, the top computer 11 in the hierarchy resides on the collection edge 30.

The number of computers in the concentric squares increases by four from concentric square to concentric square except computers residing on the collection edge 30 which do not possess a complete square of neighbors. In this case, therefore, the first square surrounding the top computer 11 in the hierarchy contains two computers 12,13.

The next concentric square contains five computers 16,17, 18,19,20. The next concentric square (not fully shown) contains six computers. The next concentric square contains nine computers, and so on.

Message Broadcast

One-to-many message broadcast may efficiently be performed by the collection of computers as each computer passes the broadcast to either one or two more computers in the next concentric polygon. FIG. 6 illustrates the rapid increase in number of computers reached with the addition of each concentric polygon.

Another look at FIG. 5A illustrates how a broadcast operation may use this configuration to relay a message from the top of the hierarchy out through the concentric squares of computers. The message is initially passed from the top computer 11 in the hierarchy to the four computers in the surrounding concentric square 12,13,14,15. In the example illustrated by FIG. 5A, the top computer 11 in the hierarchy is also the logical middle 10 of the collection of computers.

The message is then passed by the computers at the four corners of the square 12,13,14,15 to the eight computers in the surrounding concentric square 16,17,18,19,20,21,22,23. The message is then passed to the computers in the next concentric square and so on.

Another look at FIG. 5B illustrates how a broadcast operation may use this configuration to relay a message from the top of the hierarchy out through the concentric squares of computers. The message is initially passed from the top computer 11 in the hierarchy to the four computers in the surrounding concentric square 12,13,14,15.

In the example illustrated by FIG. 5B, the top computer 11 in the hierarchy is not the logical middle 10 of the collection of computers.

The message is then passed by the computers at the four corners of the square 12,13,14,15 to the eight computers in the surrounding concentric square 16,17,18,19,20,21,22,23. The message is then passed to the computers in the next concentric square and so on.

Another look at FIG. 5C illustrates how a broadcast operation may use this configuration to relay a message from the top of the hierarchy out through the concentric squares of computers. In the example illustrated by FIG. 5C, the top computer 11 in the hierarchy resides on the collection edge 30. Computers residing on the collection edge 30 do not possess a complete square of neighbors.

The message is initially passed from the top computer 11 in the hierarchy to the two computers 12,13 in the surrounding but incomplete concentric square. The message is then passed to the five computers 12,13,14,15,16. in the surrounding but incomplete concentric square. The message is then passed to the computers in the next surrounding but incomplete concentric square and so on.

As can be seen in both FIGS. 5B and 5C, there is a possibility that one or more computers will be orphaned (e.g., computer 17 in FIG. 5C), at least with respect to a message that does not originate from a top computer 11 at the logical middle 10 of the collection of computers. The existence of such orphaned computers, however, does not create a problem in most applications. Preferably, although not necessarily, a broadcast will originate from a top computer 11 that is at the logical middle of the collection of computers. Thus, the broadcast will reach all of the computers in the collection. On the other hand, messages that originate from a top computer 11 that is not at the logical middle 10 frequently do not need to reach all of the computers in the collection. For example, a search for a specified file or application normally does not have to be exhaustive because there is often sufficient redundancy in a computer network to locate a subject of a search without querying every computer in the network.

Searching the Collection of Computers for Content

A search of content residing on computers in the collection may be performed if the message passed through the hierarchy contains search parameters and the network address of the requesting computer. The message will radiate through the hierarchy causing each computer in the collection to search its local content. When a computer being searched finds a match to the searched content, that computer contacts the network address of the requesting computer and identifies the network address where the content is located.

Locating a Computer by a Name or Other Identifying Characteristic.

A computer in the collection of computers may be located by a name or other identifying characteristic if the message passed through the hierarchy contains the name or other identifying characteristic and the network address of the requesting computer. The message will radiate through the hierarchy causing each computer in the collection to compare the name or other identifying characteristic to its own name or other identifying characteristic.

Initially Creating the Collection of Computers

The collection of computers must begin with a single computer which will be the initial logical middle 10 of the collection of computers. The next four additions to the collection of computers will constitute the neighbor° 40, neighbor1 41, neighbor2 42, and neighbor3 43 neighbors of the logical middle 10 of the collection of computers.

Adding Additional Computers to the Collection of Computers

In order to become part of the collection of computers, a computer must first find another computer which is part of the collection of computers.

A computer can find to the collection of computers using several techniques including but not limited to:

(a) Trying to attach to a known list of available computers in the collection of computers.

(b) Trying to attach to a computer from a list of computers with which this computer has previously communicated.

(c) Seeking a computer connected to the collection of computers by broadcasting queries to network addresses created from an algorithm such as a random number generator.

When a new computer 32 locates a computer belonging to the collection of computers, the found computer 28 (see FIG. 7A) will reside either on a radial 26 or indirect radial 27. The neighbor2 42 of the found computer 28 will point toward the collection edge 30. By following the found computer's 28 neighbor's neighbor2s 42 one after another, the collection edge 30 may be located. The new computer 32 is attached to the collection of computers at the edge 30.

Figure 7A:
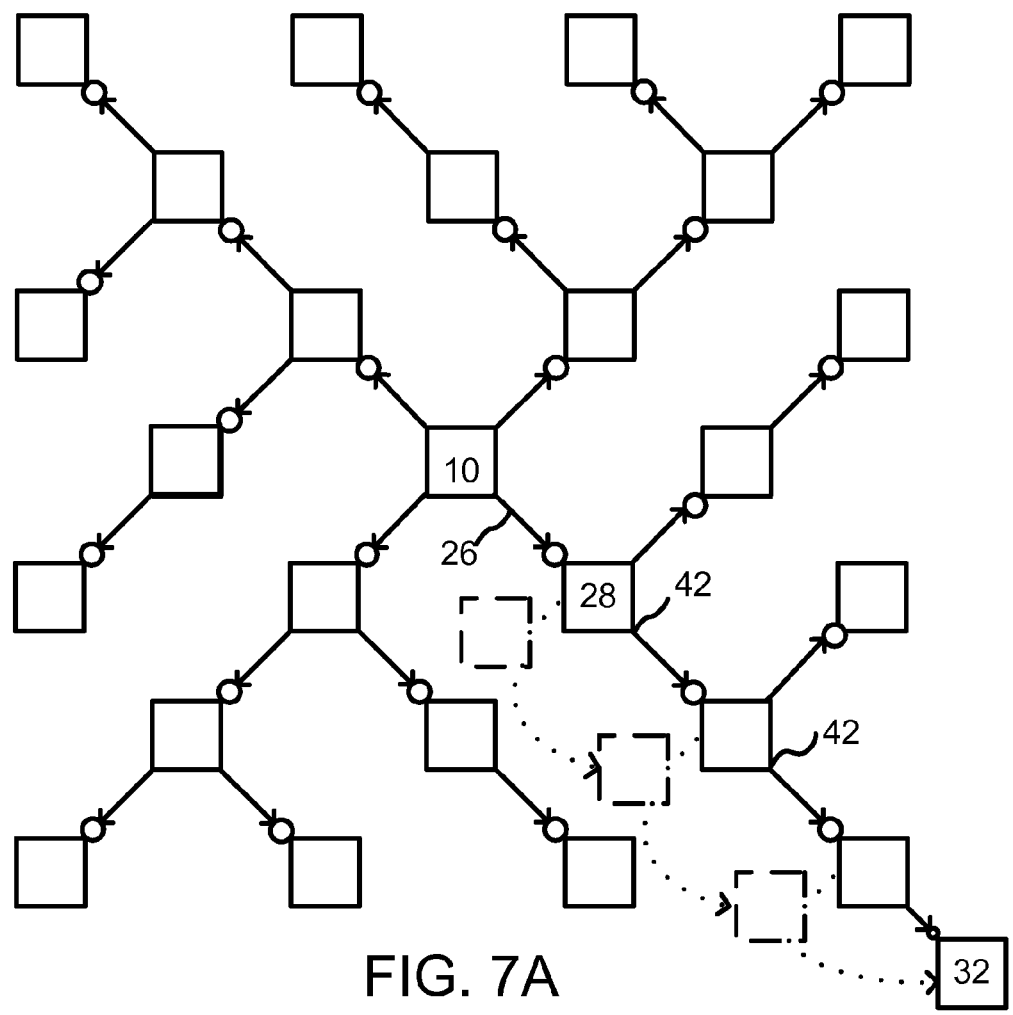
FIGS. 7A and 7B show a new computer being added to the collection of computers.

FIG. 7A illustrates following a radial 26 from the found computer 28 to the collection edge 30 to attach a new computer 32.

Figure 7B:
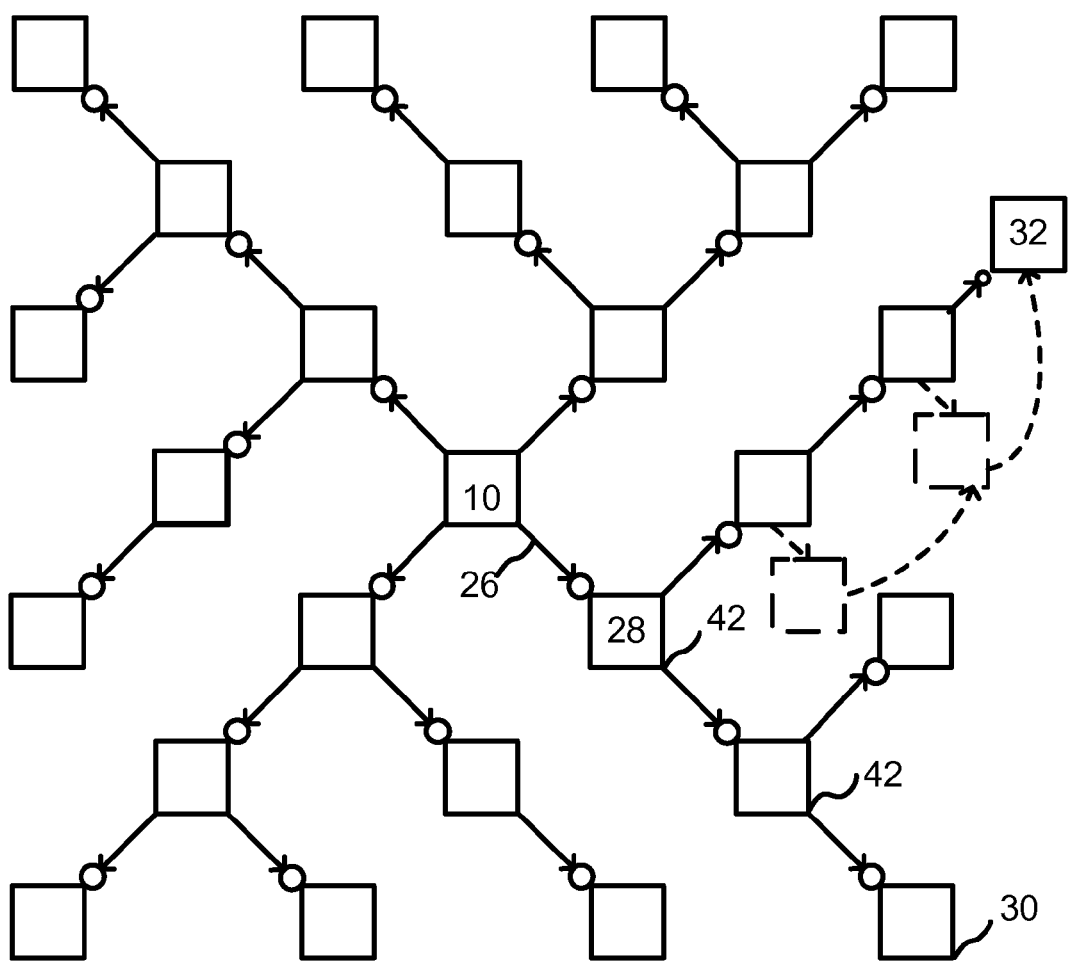

FIG. 7B illustrates following an indirect radial 27 from the found computer 28 to the collection edge 30 to attach a new computer 32.

Self Organizing a Hierarchy

Figure 8A:
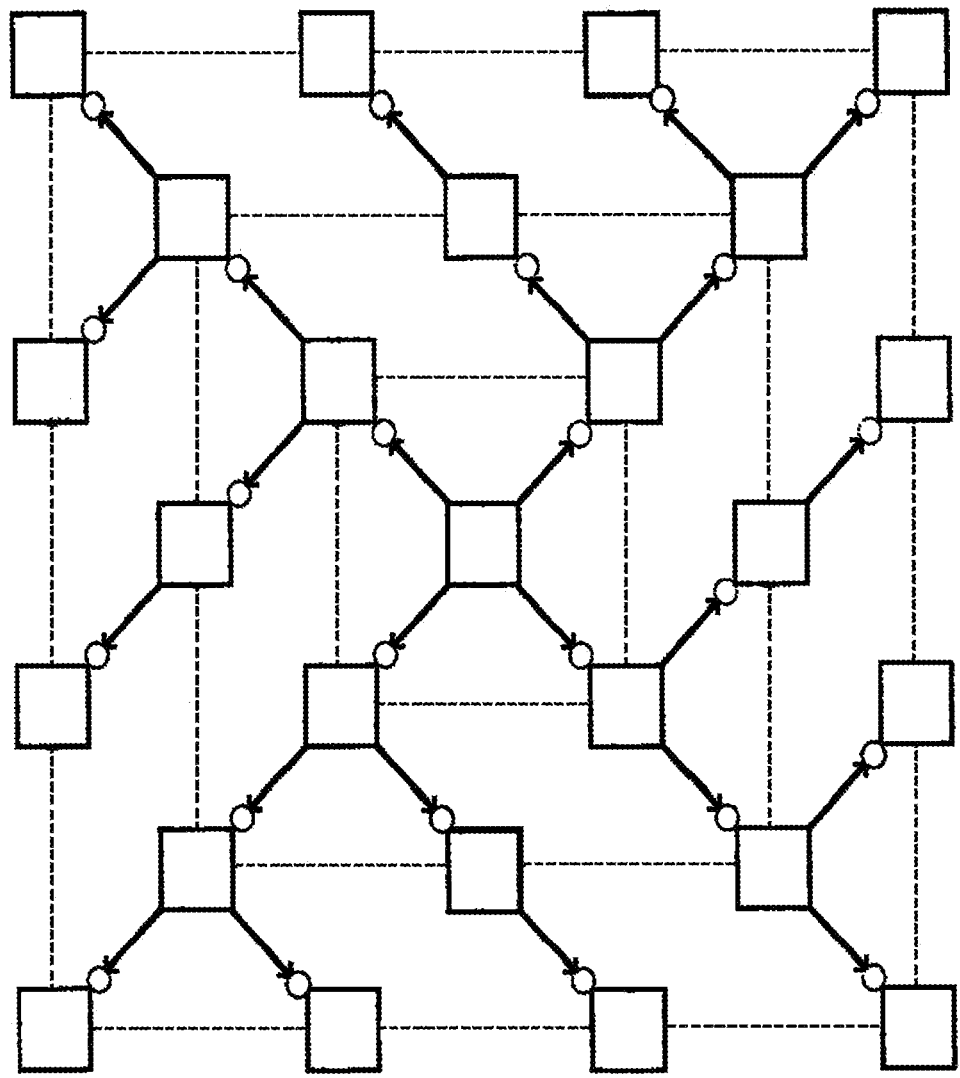
FIGS. 8A and 8B shows a non-optimized view of a quadrilateral configuration for the collection of computers and an optimized view of the same collection of computers.
Figure 8B:
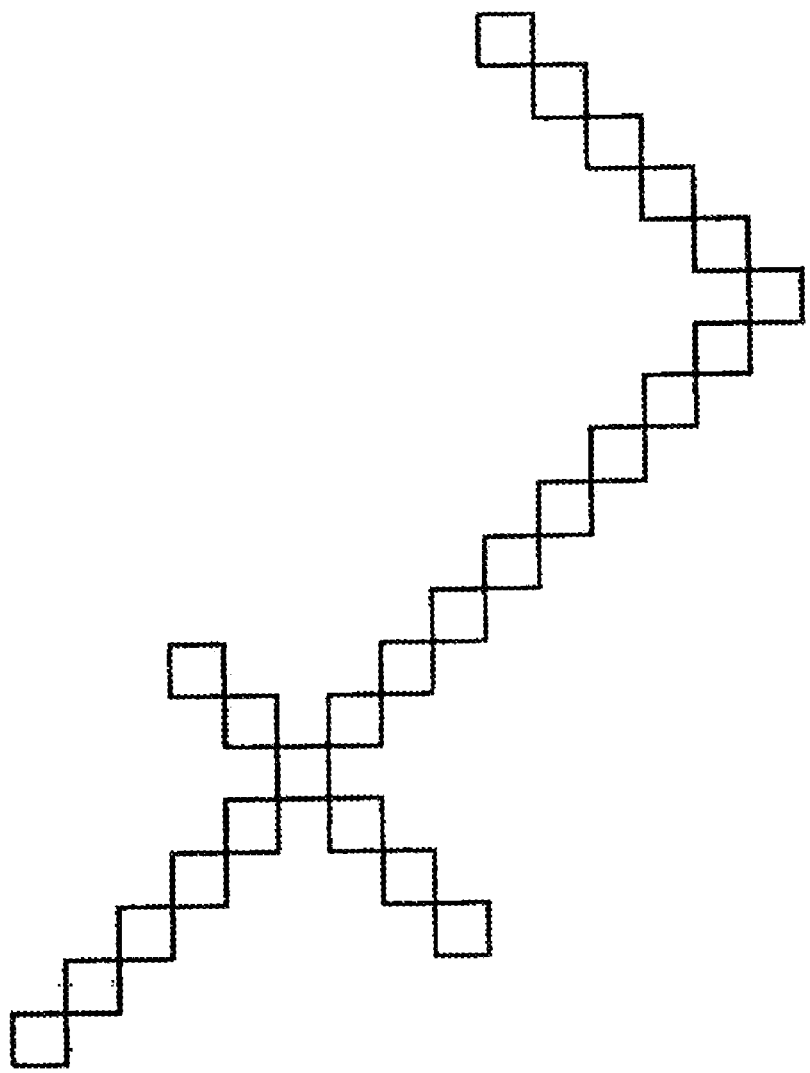

The collection of computers may be searched more rapidly if it maintains itself as a symmetrical compact shape such as that illustrated in FIG. 8A rather than a collection of long thin strings as illustrated in FIG. 8B. For example, a message can be broadcast to all 25 members of the collection of computers illustrated in FIG. 8A within three hops from the logical middle 10 of the collection of computers. However a message requires fourteen hops to be fully broadcast to the members of the collection of computers illustrated in FIG. 8B.

Figures 9A, 9A-5:
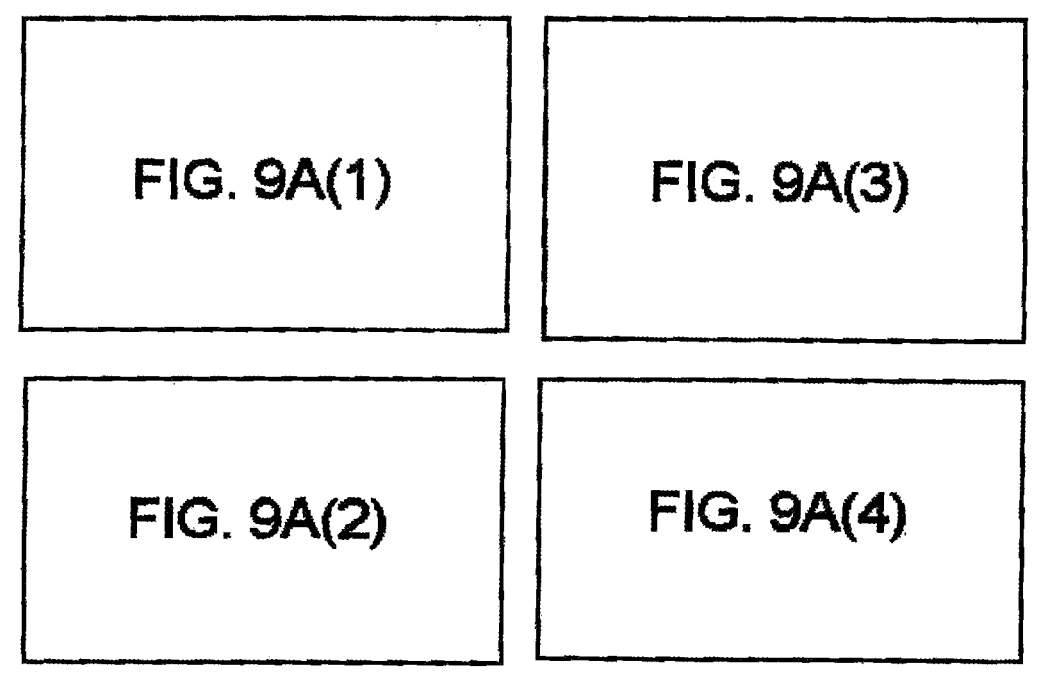

To maintain symmetrical compactness of the collected computers, each computer in the collection follows a goal seeking behavior illustrated in FIGS. 9A-1 to 9H and generally defined as:

(a) Orbit counter clockwise at the same level of concentric polygon until another computer is encountered;

(b) Decay inward until another computer is encountered.

The result of the above two rules applied by each computer in the collection will result in the creation of a logical network in the shape of a near perfect quadrilateral (or other polygon, depending on the configuration).

Self Organizing States

In the preferred embodiment, each unit follows the goal seeking behavior illustrated in FIGS. 9A-1 to 9H through the logic of a state machine. A state machine is a logical mechanism that defines the existence of a plurality of physical or logical states of being and the occurrences necessary to change the mechanism from one state of being to another.

For purposes of clarity, neighbor° 40 may be referred to as N0. Similarly neighbor1 41 may be referred to as N1, neighbor2 42 may be referred to as N2, and neighbor3 43 as N3. In some states, both the existence of a neighbor and existence of a neighbor's neighbor determine the state. In such instances, for clarity, the neighbor° of neighbor° is referred to as N00. Similarly the neighbor2 of neighbor1 is referred to as N12.

FIG. 9A-1 to 9A-4 illustrate the state diagram of the goal seeking behavior of an individual computer relative to the collection of computers of which it is a part. In particular, FIG. 9A-1 to 9A-4 exemplify the possible state transitions at least for a quadrilateral configuration. These states, however, relate only to the logical organization of the computers with respect to the logical middle 10 and not to the identify or location, at any particular time, of the top computer 11. For clarity, Each computer in the collection of computers may exist in one of the following states based on the existence and state of its neighbor units and its proximity to a radial 26:

State 1 (illustrated in FIG. 9B)—The computer is searching for a found computer 28 in the collection of computers. Three strategies are used:

(a) Search a pre existing list of network addresses of computers known to belong to the collection of computers.

(b) Search a cache of network addresses of computer with which the searching unit communicated when previously connected to the collection of computers.

(c) Use a brute force search of all possible network addresses of computers. In an embodiment using Internet addresses, the search will be made by generating random 32-bit numbers corresponding to Internet Protocol (IP) addresses and excluding the ranges of non routable IP addresses.

The searching computer confirms location of a computer in the collection of computers by executing a handshake protocol consisting of the following exchange:

(a) Searching Unit—"Are you connected to the collection of computers?"

(b) Queried Unit—"Yes I am, no I am not, or I don't understand."

When the searching computer locates the collection of computers, its state becomes State 2.

State 2 (illustrated in FIG. 9C)—The computer has located the collection of computers and is attempting to locate the collection edge 30. The computer follows the neighbor2 42 neighbor links of the found computer 28 to locate the next closest computer to the collection edge 30. The computer will continue to follow the neighbor2 42 neighbor links of successive neighbors until a neighbor is found with no neighbor2 42 link. A neighbor without a neighbor2 42 link resides on the collection edge 30.

State 3 (illustrated in FIG. 9D)—The computer is located on the collection edge 30 and on a radial 26. Since the computer is located on the collection edge 30, the computer's neighbor2 42 does not exist. Furthermore, as illustrated in FIG. 9D the neighbor01 position is vacant.

At the first opportunity, the computer will move into the neighbor01 position thereby moving closer to the logical middle 10 of the collection of computers.

State 4 (illustrated in FIG. 9E)—The computer is located on the collection edge 30 and therefore the computer's neighbor2 42 does not exist. The computer is not located on the radial, but is touching it. The computer's neighbor1 41 does not exist.

At the first opportunity the computer will move into the neighbor01 position thereby moving closer to the logical middle 10 of the collection of computers.

State 5 (illustrated in FIG. 9F)—The computer is located on an indirect radial 27. Neighbor1 41 does not exist. Neighbor2 42 does not exist, and the neighbor01 position is filled.

At the first opportunity the computer will move onto the indirect radial 27 behind the neighbor01 position thereby moving closer to the logical middle 10 of the collection of computers.

State 6 (illustrated in FIG. 9G)—The computer is located on an indirect radial 27. Neighbor1 41 does not exist. Neighbor2 42 does not exist. The neighbor01 position is vacant.

At the first opportunity the computer will move into the neighbor01 position.

State 7 (illustrated in FIG. 9H)—The computer is located on an indirect radial 27, but its Neighbor1 41 is a radial 26. Neighbor2 42 does not exist.

At the first opportunity the computer will move onto the radial 26 behind the neighbor01 position.

State 8 (illustrated in FIG. 9I)—The computer is located on an indirect radial 27. The N12 position is vacant.

At the first opportunity the computer will move into the N12 position.

State 9 (illustrated in FIG. 9J)—The computer is located on an indirect radial 27. Neighbor1 41 exists and Neighbor1 41 is on a radial 26.

This is a stable state. No movement is possible without other neighbors moving first.

State 10 (illustrated in FIG. 9K)—The computer is located on a radial 26. Either Neighbor1 41 or Neighbor2 42 exist preventing movement.

This is a stable state. No movement is possible without other neighbors moving first.

State 11 (illustrated in FIG. 9L)—The computer is located on an indirect radial 27. Either Neighbor2 42 or N12 exist preventing movement. One neighbor must exist to prevent movement.

This is a stable state. No movement is possible without other neighbors moving first.

State 12 (illustrated in FIG. 9M)—The computer is located on a radial 26. Neighbor° 40 is vacant. Either neighbor1 41 or neighbor3 43 exist so there is a way to link to the neighbors of the missing neighbor° 40.

At the first opportunity, the computer will move into the vacant neighbor° 40 position.

State 13 (illustrated in FIG. 9N)—The computer is located on an indirect radial 27 but is touching a radial 26. Neighbor° 40 is vacant. Either neighbor1 41 or neighbor3 43 exist so there is a way to link to the neighbors of the missing neighbor° 40.

At the first opportunity, the computer will move into the vacant neighbor° 40 position.

State 14 (illustrated in FIG. 9O)—The computer is located on an indirect radial 27. Neighbor° 40 is vacant. Either neighbor1 41 or neighbor3 43 exist so there is a way to link to the neighbors of the missing neighbor° 40.

At the first opportunity, the computer will move into the vacant neighbor° 40 position.

State 15 (illustrated in FIG. 9P)—The computer is located on an indirect radial 27. Neighbor° 40 exists. Neighbor1 41 is vacant. Neighbor2 42 is vacant. Neighbor 01 is vacant.

At the first opportunity, the computer will move into the vacant neighbor01 position.

Bandwidth Availability Sorting

After entering one of the stable states, each computer will compare its available network bandwidth with that of its Neighbor0 40. If the computer's available network bandwidth is greater than that of its Neighbor0 40, the computer and its Neighbor0 40 will swap places in the collection of computers.

The effect of the computers swapping places is that the collection of computers becomes sorted by available network bandwidth. The computers with the greatest amount of available network bandwidth will be closest to the logical middle 10 of the collection of computers.

Failure Recovery

The collection of computers can rebuild the connections necessary for broadcast and searching in the event a computer in the collection becomes disabled by a hacking attack or ceases functioning due to technical or network problems.

Figure 10A:
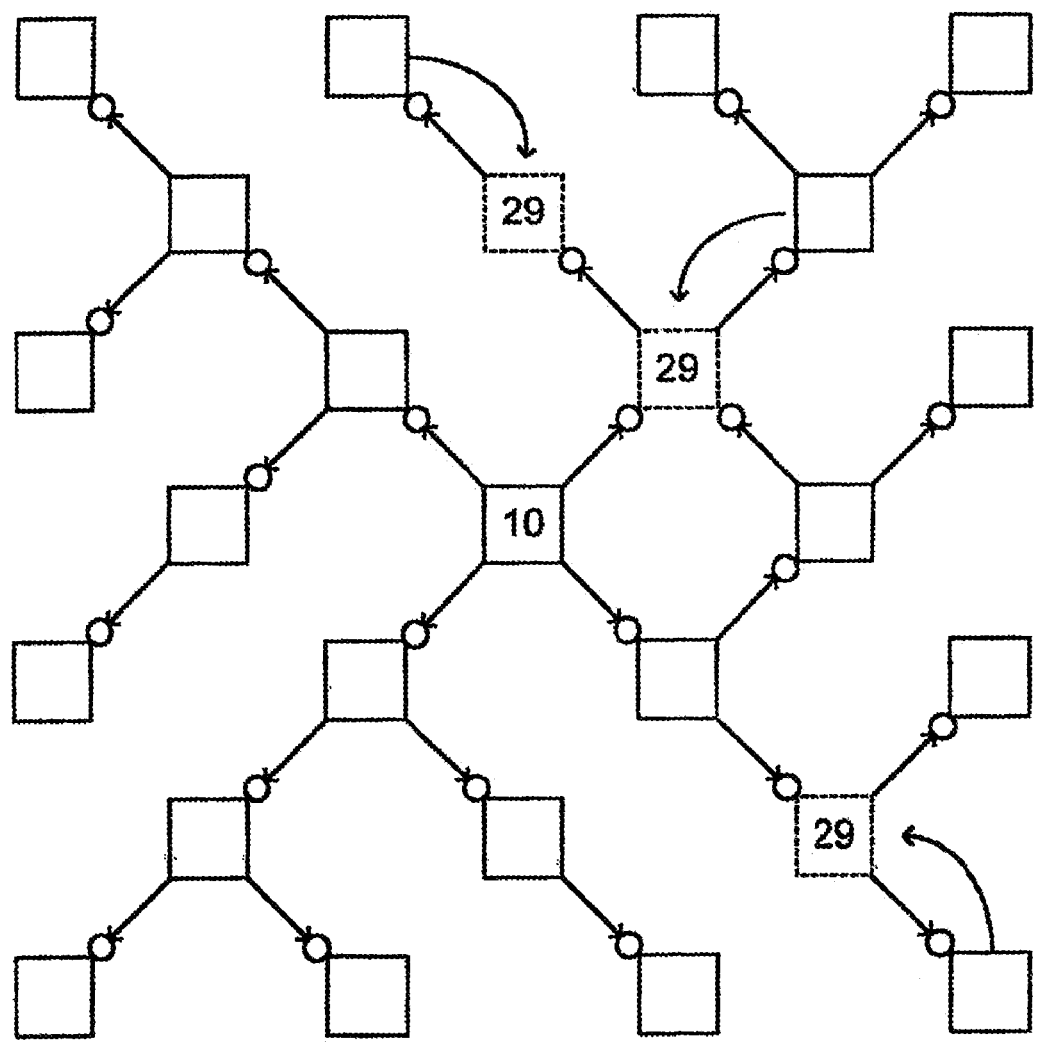
FIGS. 10A to 10C show a view of a quadrilateral configuration with three missing computers.
Figure 10B:
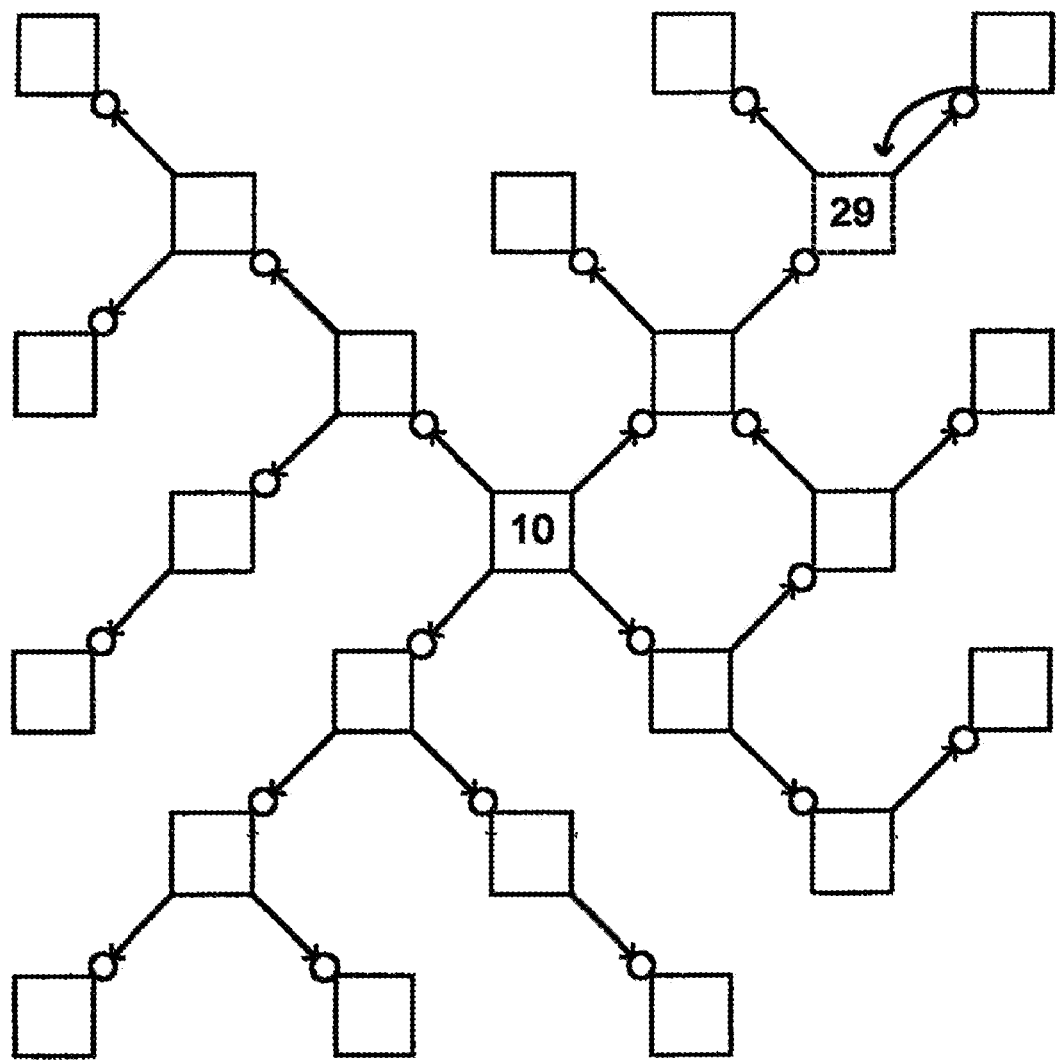
Figure 10C:
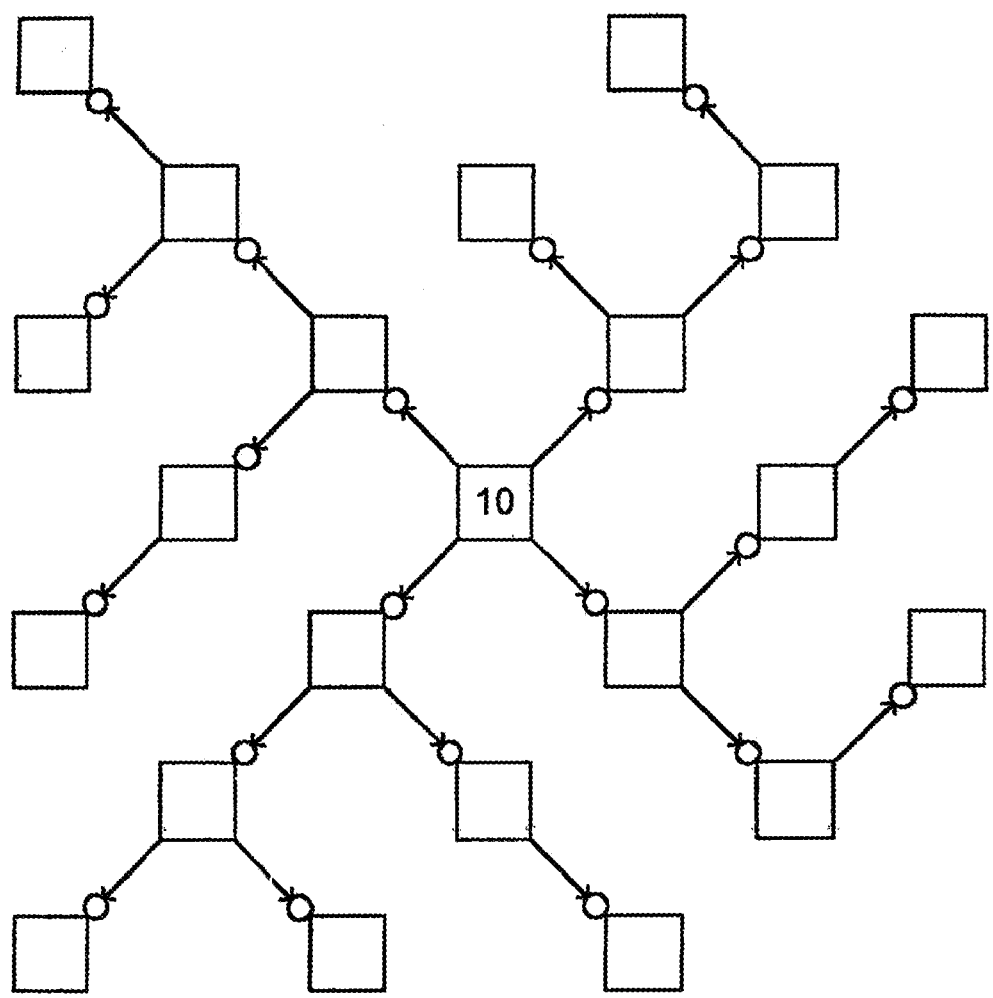

FIG. 10A illustrates the collection of computers following the disabling of several computers. The disabled computers 29 are unable to pass along broadcast messages and must therefore be replaced. FIG. 10B through FIG. 10C illustrate the process by which the remaining computers in the collection reorganize the remaining computers.

Once the disabled computers have been removed from the interior of the collection of computers, the reorganization will continue to rebuild the symmetrical compactness illustrated in FIGS. 9B to 9K.

Computer Locking

Each computer in the collection of computers functions as an autonomous unit asynchronously related to its neighbors. In order to synchronize the movements of computers to different positions in the collection, it is necessary to prevent race conditions or ambiguous situations which could occur should a computer make a decision based on the states of its neighbors and move its position at the same time the neighbor's states are changing.

For this reason a computer in the collection will lock its neighbors from making any moves until it:

(a) Senses the state of its neighbors.

(b) Decides if a move is necessary.

(c) Performs the move.

The lock has a timeout to prevent a never ending lock should the locking computer be disabled in some way before releasing the lock.

Limiting Broadcast or Searches

In some cases it may be desirable to limit message broadcast or content searches to a subset of the collection of computers. In that case, the broadcast or search may be limited by specifying the number of concentric rings to search relative to the computer requesting the broadcast or search.

Bandwidth Throttling

If all computers in the collection of computers do comprehensive message broadcasts or content searches, the communications means logically connecting the computers may become congested.

Any computer in the collection of computers can view the sum total of the communications traffic between all computers. Should the communications traffic begin to approach to capacity of the logical communications channel a means of reducing the traffic must be considered.

The following technique is fair to each user of the collection of computers, rewards efficient use, and penalizes overused. Before each broadcast or search is initiated, each and every computer in the collection of computers will perform the following before performing a broadcast or search:

(a) Measure the logical communication channel bandwidth utilization.

(b) If the utilization is below a predetermined desired threshold, proceed with the broadcast or search, otherwise, (c) Calculate the time since the last search.

(d) If the time since the last search is less than a predetermined amount, insert a predetermined delay in front of the request for broadcast or search which is related to the amount the communications channel bandwidth utilization exceed the predetermined desired threshold.

The above algorithm will assure that broadcast and search performance will degrade gracefully under heavy use of the collection of computers.

Caching Computers

If the collections of computers large enough and search demands frequent enough to fill the logical communication channel bandwidth, a more efficient use of bandwidth is possible by defining a subset of the collection of computers to perform a caching function.

The computers chosen to perform the caching function are those with faster network connections.

Figure 11:
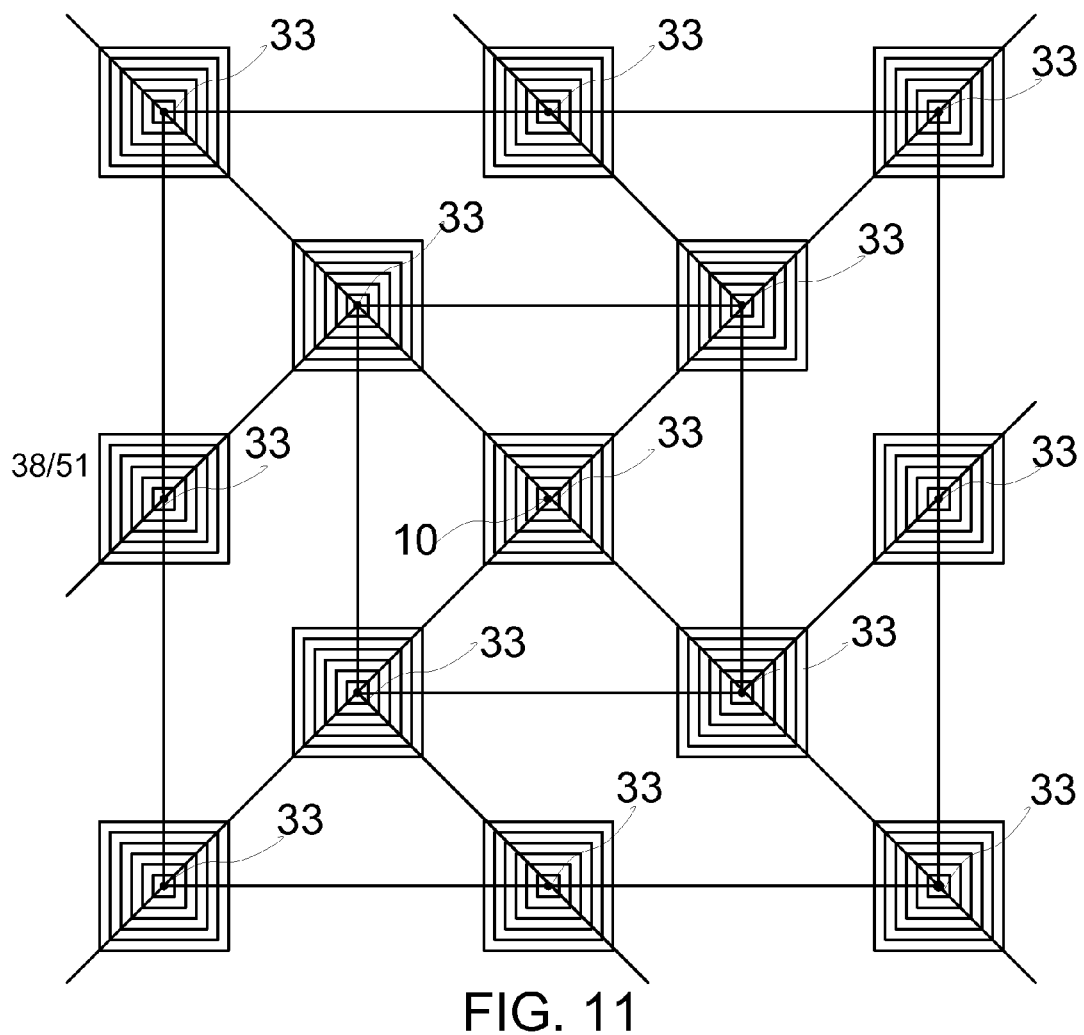
FIG. 11 shows the organization of computers with a subset of computers performing caching.

FIG. 11 illustrates the preferred embodiment of the caching organization. In FIG. 11 the caching computers 33 are organized into a collection of computers similar to the collection of non-caching computers shown in FIG. 2. Each caching computer 33 is the logical middle of a collection of computers. As such, the caching computers 33 and the underlying collections of computers represent a hierarchy within a hierarchy or, in an alternative way of looking at it, a simple type of three dimensional configuration. Each caching computer 33 caches the content index and name or other identifying characteristic of each computer in the collection of computers which surround the caching computer 33.

Each caching computer 33 is also a member of the collection of caching computers. The collection of caching computers self organizes itself so that the computer with the most available network bandwidth resides at the logical middle 10 of the collection of caching computers.

Each caching computer in the collection of caching computers compares its available network bandwidth with the network bandwidth of its neighbor nearer the logical middle of the collection of caching computers. If the caching computer possesses more available network bandwidth than its neighbor, the computer and its neighbor swap positions in the collection of caching computers.

Each caching computer in the collection continuously performs the compare and swap operation, such that the collection of caching computer is always sorted with the computer having the most available network bandwidth located at the logical middle of the collection of caching computer and each concentric polygon contains computers with successively less available network bandwidth.

Adding a Caching Computer

A caching computer is added to the collection of caching computers in much the same way as a computer is added to the collection of computers as described in Self Organizing a Hierarchy and illustrated in FIGS. 9A-1 to 9P.

A new caching computer can find the collection of caching computers using several techniques including but not limited to:

(a) Trying to attach to a known list of available caching computers in the collection of caching computers.

(b) Trying to attach to a caching computer from a list of caching computers with which this computer has previously communicated.

(c) Seeking a computer connected to the collection of caching computers by broadcasting queries to network addresses created from an algorithm such as a random number generator.

When a new caching computer locates a computer belonging to the collection of caching computers the found caching computer will reside either on a radial 26 or an indirect radial 27. The tail 41 of the found caching computer 28 will point toward the collection edge 30. By following the found caching computer's 28 neighbor's tail to head one after another, the collection edge 30 may be located. The new caching computer is attached to the collection of caching computers at the edge 30.

To maintain symmetrical compactness of the collected computers, each computer in the collection follows a goal seeking behavior as illustrated in FIG. 9:

(a) Orbit counter clockwise at the same level of concentric polygon until another computer is encountered;

(b) Decay inward until another computer is encountered.

A newly added caching computer will have a large amount of available network bandwidth, and as such will swap positions with its neighbors until it reaches the logical middle of the collection of caching computers. Preferably, a newly added computer will be designated as a caching computer based on whether the newly added computer possesses an available amount of bandwidth greater than some threshold. Newly added computers that do not possess an amount of bandwidth over the threshold are added as non-caching computers.

Adding a Non-Caching Computer

In a caching system, a new computer 32 locates the collection of computers and then follows the head to toe links until it reaches the logical middle 10 of its collection of computers. The logical middle will be a caching computer that also belongs to the collection of caching computers.

The new computer 32 will follow the head to toe links of the collection of caching computers until it reaches the logical middle of the collection of caching computers. The new computer 32 will provide the caching computer with its network address, the index of its content, and its name or other identifying characteristics. The new computer 32 will then follow a radial 26 of the collection of non-caching computers attached to the logical middle of the collection of caching computers. The new computer 32 will attach itself to the edge 30 of the collection of computers and begin the self-organizing logic to seek a position.

Self Balancing Cache

Due to the bandwidth availability comparison logic, the computer at the logical middle of the collected caching computers will always be the caching computer with the most available bandwidth. New non-caching computers will always be added to the collection of non-caching computers attached to this caching computer.

As more non-caching computers are added to the caching computer with the most available bandwidth, it will eventually have less available bandwidth than another caching computer in the collection of caching computers and be replaced at the middle of the collection of caching computers by a computer with more bandwidth available. In the above fashion, the collection of caching computers will always maintain an optimally balanced distribution of non-cached computers attached to each caching computer.

Unavailable Computer

From time to time, a caching computer will poll each of the computers in its collection of non-caching computers. When a computer that is a member of a collection of computers headed by a caching computer becomes unavailable or unusable through some sort of
failure, the caching computer will remove the unavailable computers cached content index, name, and other identifying characteristics.

Unavailable Caching Computer

From time to time, a caching computer will fail to respond to communications from non-caching computers in its collection of computers. The caching computer will be replaced by one of the non-caching computers in its collection of computers using the algorithms illustrated in FIG. 9A-1 to 9P.

Should there be no more non-caching computers available in the disabled caching computers collection of computers, the collection of caching computers will fill in the void using the logic illustrated in FIG. 9A-1 to 9P.

Auto-Update

The invention embodies a feature by which a computer compares its version of software that controls the collection of computers to that of the neighbor 40,41,42,43 with which it is preparing to communicate. If the computer requesting the communication possesses a more recent version of the software that controls the collection of computers, then that version of software is
transferred to the neighbor 40,41,42,43.

If the neighbor 40,41,42,43 to which communications is being requested posses a more recent version of the software that controls the collection of computers, then the more recent version of the software is transferred from the neighbor 40,41, 42,43 to the computer requesting the communications.

In this fashion, a software update applied to any computer in the collection of computers will propagate through the collection of computers at about the same rate as a message broadcast.

Distributing Executables Across the Collection of Computers

It is possible using the auto-update mechanism described above to distribute executable programs to all computers in the collection of computers.

It is possible using the auto-update mechanism described above to distribute executable programs to a subset of all the computers in the collection of computers by limiting the distribution to computers within a fixed number of concentric polygons of the computer initiating the distribution.

The computers receiving executable programs using the auto-update mechanism may be commanded to perform certain operations using the executable programs distributed using the auto-update mechanism including executing the programs to perform a calculation or other operation and returning a result to the computer initiating the distribution of the executable.

Broadcast of Streaming Media

Figure 12:
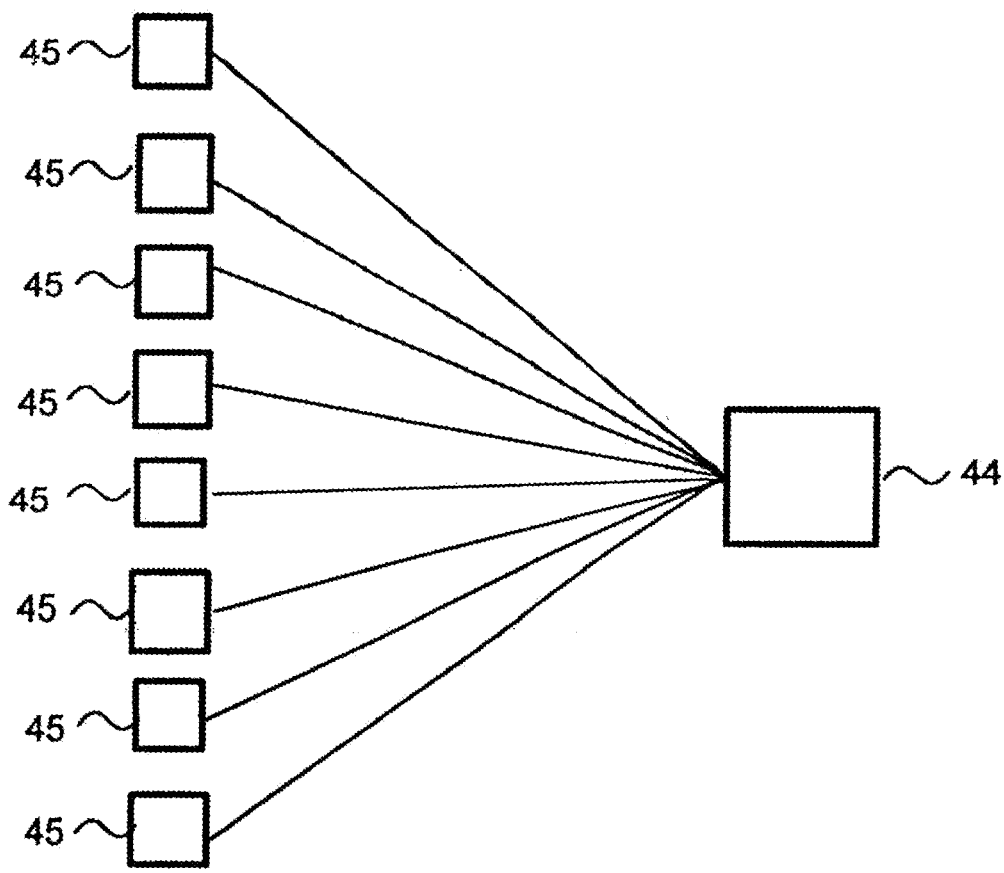
FIG. 12 shows a WEBcast server connected to an array of WEBcast players.

One embodiment of the invention provides for the one to many broadcast of streaming media. Streaming media include but are not limited to WEB radio and corporate WEBcasts. Current broadcast technology requires the originator posses a large server and high speed network connection necessary to open the required channel to each and every destination as illustrated in FIG. 12. Therefore a doubling of destinations requires a doubling of the originator's network bandwidth.

Figure 13:
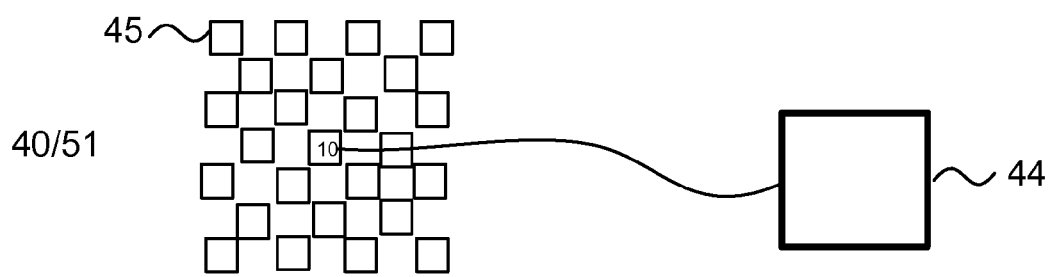
FIG. 13 shows a WEBcast server connected to the logical middle of WEBcast players.

The invention offers an efficient means to broadcast streaming media by sharing the necessary bandwidth and computing power with each destination computer. FIG. 13 illustrates the streaming media possible with the collection of computers created by the invention.

The advantages of the invention over existing solutions are:
(a) The originator's network bandwidth need only be as large as that necessary for a single stream of the media.
(b) The number of destinations may be increased irrespective of the bandwidth of the originator's network connection.
(c) The number of destinations may be increased virtually without limit.

Making a Streaming Media Connection

A WEB radio station is an existing example of streaming media. With current technology, a user with a media player program contacts the station's WEB page, provides the user's network address, and requests to be connected to the station's streaming media server. The media server opens a connection and begins sending the media information to the user's media player at the user's network address. The media information is virtually the same as that sent to every other user.

When using one embodiment of the invention, a user with a media player program and a program implementing the invention contacts the station's WEB page, provides the user's network address, and requests to be connected to the station's streaming media server. The station streaming media server is using a version of the invention.

The media server directs the new user to the logical middle of the collection of computers 10. The new user's computer 32 follows the protocol described in FIGS. 9A-1 to 9P to attach to the collection of computers. Upon attachment to the collection of computers, the new computer 32 will begin receiving the streaming media from the neighbor to which its head 40 is attached.

When yet another computer is attached to the new computer 32, the new computer 32 will forward the streaming media to the added computer.

When a Computer Disconnects or Becomes Unavailable

When a computer in the collection of computers used to broadcast streaming media disconnects or otherwise becomes unavailable, the invention replaces the unavailable computer in the collection of computers using the protocol illustrated in FIGS. 10B and 10C.

Bandwidth Requirements

Each computer in the collection of computers requires an available outbound network bandwidth the same as the inbound network bandwidth of the streaming media. The exceptions are computers which reside on radials 26 which require twice the available outbound bandwidth as inbound bandwidth.

ADVANTAGES OF THE INVENTION

The invention possesses the following advantages over the previous art include:

(a) The ability to broadcast a message from any computer in a collection of computers to broadcast to the balance of the collection by distributing the computing power and communications bandwidth required by the broadcast to the collection of computers.

(b) The ability of any computer in a collection of computers to search for content in a collection of computer by distributing the computing power and communication bandwidth required by the search to the collection of computers.

(c) The ability of any computer in a collection of computers to search for another computer in the collection of computers by a name or other identifying characteristic
by distributing the computing power and communication bandwidth required by the search to the collection of computers.

(d) The ability to self organize computers into a collection of computers such that the computing power and communication bandwidth of the collection may be used to broadcast from one computer to the balance of computers in the collection; such that the computing power and communication bandwidth of the collection may be used to search for content existing on the collection of computers; and such that the computing power and communication bandwidth of the collection may be used to locate a computer in the collection by name or other identifying characteristic.

(e) The ability to self organize computers which possess transient network addresses into a collection of computers such that the computing power and communication bandwidth of the collection may be used to broadcast from one computer to the balance of computers in the collection; such that the computing power and communication bandwidth of the collection may be used to search for content existing on the collection of computers; and such that the computing power and communication bandwidth of the collection may be used to locate a computer in the collection by name or other identifying characteristic.

(f) The ability of an organized collection of computers to self repair itself after some computers become inoperative to an attack or technical malfunction. Referring now to FIG. 1, Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

The invention claimed is:

1. A distributed computer network comprising:
a collection of computers logically arranged such that a first computer of the collection of computers is situated at a logical center of the collection of computers, wherein a plurality of computers from the collection of computers form a series of concentric polygons around the first computer; and
wherein each computer in the collection of computers can interchangeably operate as a top computer in a hierarchy of computers based on the transmission of a message, said hierarchy including at least a subset of the collection of computers by:
the top computer sending the message along each of a set of direct radials, each direct radial comprising a line of logically adjacent computers in the collection of computers that logically extends radially from said top computer; and
at least one lower level computer, of the collection of computers, located on one of the set of direct radials further forwarding the message along an indirect radial of a set of indirect radials, each indirect radial comprising a line of logically adjacent computers in the collection of computers that logically extends radially from said at least one lower level computer but does not logically intersect any of the direct radials in the set of direct radials.

2. The distributed computer network of claim 1 wherein each computer in the collection of computers not located on an outermost edge of the collection of computers has a set of radials extending therefrom equal in number to the number of sides of each of the concentric polygons in the series of concentric polygons.

3. The distributed computer network of claim 1, wherein each computer in the collection of computers is programmed to shift position in the series of concentric polygons to a first position closer to the first computer when the first position is not occupied and further is programmed to shift position in one of a clockwise direction and a counterclockwise direction, to a second position when the second position is not occupied.

4. The distributed computer network of claim 3, wherein each computer in the collection of computers is further programmed to prevent a set of neighboring computers from shifting positions.

5. The distributed computer network of claim 1 wherein each computer in the collection of computers is further programmed to store information relating to each of a plurality of subordinate computers logically connected to and located around the respective computer.

6. The distributed computer network of claim 5 wherein a top computer in the collection of computers is programmed to initiate a search for a set of content on the plurality of subordinate computers by sending the message.

7. The distributed computer network of claim 1 wherein the message is selected from the group consisting of broadcast data, a search parameter, and update information.

8. The distributed computer network of claim 1 wherein, other than the top computer, each computer in the collection of computers on a direct radial forwards the message to two other computers and each computer in the collection of computers not on a direct radial forwards the message to one other computer.

9. The distributed computer network of claim 8 wherein each of the computers in the collection of computers is forwarded the message only once.

10. A method for logically configuring a collection of computers, comprising:
selecting a first computer from the collection of computers to serve as a logical center of the collection of computers;
selecting a second computer from the collection of computers to serve as a top computer in the collection of computers;

adding computers to the collection of computers to logically configure the computers into a plurality of concentric polygons, wherein each added computer operates to:
  find a computer in the collection of computers;
  follow one of a radial and an indirect radial that includes the found computer to a collection edge, said radial comprising a series of logically adjacent radial computers that logically extend from the logical center, and said indirect radial comprising a series of logically adjacent computers that logically extend from one of the radial computers, forming a concentric set of logical levels, wherein the collection edge comprises a logically outermost computer on said one of the radial and the indirect radial; and
  logically attach to a computer in the collection of computers on the collection edge.

11. The method of claim 10, further comprising the step of moving each added computer to a first neighboring logical position that is logically closer to the logical center of the collection of computers if the first neighboring logical position is not occupied.

12. The method of claim 11, further comprising the step of rotating each added computer to a second neighboring logical position on the same concentric logical level as the added computer if the second neighboring logical position is not occupied.

13. The method of claim 12, wherein the step of rotating comprises rotating in a preselected one of a clockwise and a counterclockwise direction.

14. The method of claim 12, further comprising the step of preventing other computers from moving into the first neighboring logical position and from moving into the second neighboring logical position during said steps of moving and rotating.

15. The method of claim 10, wherein each of the plurality of concentric polygons has the same number of sides and has an even number of sides.

16. A method for logically configuring a collection of computers, comprising:
  selecting a computer to serve as a logical center of the collection of computers;
  selecting a computer to serve as a top computer in the collection of computers;
  arranging computers from the collection of computers such that the collection of computers is logically configured to form a set of successively higher concentric polygon levels around the logical center;
  adding a computer to the collection of computers;
  logically connecting the added computer to a computer in the collection of computers in a logical position, located at a collection edge, wherein the collection edge comprises a logical outer edge of the collection of computers and forms a concentric polygon level around the plurality of concentric polygon levels; and repeating the steps of:
  changing the logical location of the added computer to a next lower concentric polygon level if a computer in the collection of computers is not situated at a logical position that neighbors the added computer at the next lower concentric polygon level; and
  changing the logical location of the added computer to a logically adjacent position on a current concentric polygon level of the added computer if a computer in the collection of computers is not situated at said logically adjacent position.

17. The method of claim 16, further comprising the step of sending a message from the top computer of the collection of computers to each of a plurality of neighboring radial computers, each neighboring radial computer forwarding the message to another neighboring radial computer and to a neighboring indirect radial computer, such that the message is forwarded to each computer in the collection of computers only once.

18. The method of claim 16, wherein the collection of computers comprises one of a collection of caching computers and a collection of non-caching computers, wherein each caching computer stores information relating to a corresponding collection of caching computers.

19. A computer network, comprising:
  a collection of caching computers logically arranged such that a first caching computer is situated at a logical center of the collection of caching computers, wherein the remaining caching computers are logically arranged to form at least one concentric polygon around the first caching computer;
  at least one collection of non-caching computers, each respective collection of non-caching computers logically arranged to form a plurality of successively higher concentric polygon levels around a respective caching computer that stores information relating to the respective collection of non-caching computers;
  at least one communication medium providing a physical interconnection between the caching computers in the collection of caching computers and the non-caching computers in the at least one collection of non-caching computers, said physical interconnection unrelated to said logical arrangements; and
  at least one of the collection of caching computers and the at least one of the collection of non-caching computers logically arranged such that a message originating at a top computer is forwarded along each of at least one radial, each said radial comprising a line of logically adjacent computers that logically extends radially from the top computer, and wherein a plurality of computers forming the radial further forward the message along an indirect radial, each said indirect radial comprising a line of logically adjacent computers that logically extends radially from a corresponding one of the plurality of computers and that does not intersect any of the at least one radial.

20. The computer network of claim 19, wherein each caching computer operates to determine whether its available bandwidth is greater than an available bandwidth of a logically adjacent caching computer logically closer to the first caching computer and to switch positions with the logically adjacent caching computer when the available bandwidth of the caching computer is greater than the available bandwidth of the logically adjacent caching computer.

21. The computer network of claim 20, further comprising at least one added non-caching computer, wherein the added non-caching computer logically attaches to a collection of non-caching computers associated with a caching computer currently situated at the logical center of the collection of caching computers.

22. The computer network of claim 19, wherein the information relating to the respective collection of non-caching computers comprises an index of data stored on the respective collection of non-caching computers.

23. The computer network of claim 19, further comprising at least one added computer, wherein the at least one added computer is assigned as one of a caching computer and a non-caching computer based on an available bandwidth of the at least one added computer.

24. The computer network of claim 19, wherein the message comprises one of broadcast information and search request data.

* * * * *